United States Patent
Howell, Jr. et al.

(10) Patent No.: US 8,398,935 B2
(45) Date of Patent: Mar. 19, 2013

(54) SHEATH FLOW DEVICE AND METHOD

(75) Inventors: Peter B. Howell, Jr., Gaithersburg, MD (US); Frances S. Ligler, Potomac, MD (US); Adam R. Shields, Alexandria, VA (US)

(73) Assignee: The United States of America, as represented by the Secretary of the Navy, Arlington, VA (US)

(*) Notice: Subject to any disclaimer, the term of this patent is extended or adjusted under 35 U.S.C. 154(b) by 242 days.

(21) Appl. No.: 13/081,688

(22) Filed: Apr. 7, 2011

(65) Prior Publication Data

US 2011/0193259 A1    Aug. 11, 2011

Related U.S. Application Data

(63) Continuation-in-part of application No. 11/423,225, filed on Jun. 9, 2006, now Pat. No. 8,361,413.

(60) Provisional application No. 60/690,057, filed on Jun. 9, 2005.

(51) Int. Cl.
  *B01L 3/00* (2006.01)
  *C12Q 1/68* (2006.01)
  *G01N 21/75* (2006.01)
  *G01N 1/10* (2006.01)
  *G01N 33/543* (2006.01)
  *G01N 33/554* (2006.01)
  *G01N 33/551* (2006.01)
  *G01N 33/544* (2006.01)
  *C12N 11/00* (2006.01)

(52) U.S. Cl. ........ 422/503; 422/500; 422/501; 422/502; 422/504; 422/50; 422/401; 422/402; 435/174; 436/180; 436/518; 436/519; 436/524; 436/528

(58) Field of Classification Search .......... 422/500–504; 436/180
See application file for complete search history.

(56) References Cited

U.S. PATENT DOCUMENTS

2003/0051760 A1* 3/2003 Johnson et al. ............... 137/896

OTHER PUBLICATIONS

Hydrodynamic Shaping, Polymerization, and Subsequent Modification of Thiol Click Fibers, Darryl A. Boyd, et al., ACS Appl. Mater. Interfaces 2013, 5, 114-119.*
Hydrodynamically directed multiscale assembly of shaped polymer fibers, Adam R. Shields, et al., The Royal Society of Chemistry 2012 Soft Matter, 2012, 8, 6656-6660.*

* cited by examiner

*Primary Examiner* — Dean Kwak
(74) *Attorney, Agent, or Firm* — Amy L. Ressing; Roy Roberts

(57) ABSTRACT

A sheath flow system having a channel with at least one fluid transporting structure located in the top and bottom surfaces situated so as to transport the sheath fluid laterally across the channel to provide sheath fluid fully surrounding the core solution. At the point of introduction into the channel, the sheath fluid and core solutions flow side by side within the channel or the core solution may be bounded on either side by the sheath fluid. The system is functional over a broad channel size range and with liquids of high or low viscosity. A wide variety of shapes of fibers and other materials can be produced from this system through the use of polymerizable material.

20 Claims, 28 Drawing Sheets

SHEATH FLOW DEVICE AND METHOD

CROSS-REFERENCE TO RELATED APPLICATIONS

This application is a Continuation-In-Part of U.S. patent application Ser. No. 11/423,225 filed on Jun. 9, 2006, which claims the benefit of U.S. Provisional Patent Application Ser. No. 60/690,057 filed on Jun. 9, 2005. This application is also related to U.S. patent application Ser. No. 12/987,251 filed on Jan. 10, 2001. Each of these three applications is incorporated herein by reference.

BACKGROUND

Sheath flow is a widely used technique for a variety of applications, including but not limited to particle counting, flow cytometry, waveguiding, and fluid control. Sheath flow involves surrounding a central flow stream (the core) with a surrounding stream (the sheath). In particle counting and flow cytometry applications, the sheath prevents particles in the core from coming into contact with the walls of the channel, thus preventing adhesion and clogging. The sheath also serves to focus the particles or molecules into the center of the channel, allowing for easy counting or measurement through optical or other means. Sheath flow is normally laminar flow that substantially avoids mixing between the core stream and the sheath stream. Sheath flow can also be used with fluids of different refractive index to create a waveguide in the core or sheath stream in order to measure transfer of analytes from one stream to the other or to control the rate of interaction between molecules in one or both streams for carefully controlled chemistry or analysis.

Previous designs have created sheath flow through an annular arrangement. A small nozzle was positioned inside a larger tube. The core solution was pumped through the nozzle and the sheath solution was pumped through the larger tube. This configuration required careful alignment of the two tubes and did not easily lend itself to miniaturization. Since the diameter of the nozzle was fixed, the relative sizes of the core stream and sheath solution were relatively constant within a set range.

Other devices provide sheath flow on a chip, but the flow typically operates only in two dimensions. The core stream in these devices is bordered on either side by the sheath streams, however the core is not sheathed top and bottom. The complexity of the support plumbing for these devices is increased, as the number of flow streams is increased from two to three as compared to the annular arrangement design. It is possible to sheath the stream on the top and bottom of the core stream in these systems by adding two additional inlet ports in the top and bottom of the channel. However, this greatly increases the manufacturing complexity of the device. Micromachining technologies are inherently two-dimensional. Three-dimensional channel paths can be created by stacking several two dimensional designs on top of one another, but this adds to the complexity and difficulty of the manufacturing process. Creating a fully sheathed flow in this way could require at least several individual levels, which must be independently produced and then carefully aligned. In addition, use of the device could require multiple pumps to provide solutions to all the inlets.

Flow cytometry is a common technique used to count and evaluate cells and other particles in suspension. In traditional flow cytometers, the sample solution exits a small tube into the center of a larger tube, carrying clean solution. The larger tube is then constricted so that both streams are reduced in diameter and accelerate. The sample stream is reduced in diameter to roughly the size of the cells to be analyzed. This forces the cells to travel in single file, along a fixed and highly precise trajectory within the flow channel. Because the cells are positioned so reproducibly, high numerical aperture optics can be precisely aligned to interrogate them. Alternatively, electronic methods, such as capacitance or impedance changes, could be used for interrogation. Also, because the cells are all following the same path down the channel, they all have the same velocity. This allows the duration and intensity of signals to be correlated with individual cells and particles.

Because of the success of bench-top cytometers, there have been several attempts to create a miniaturized flow cytometer. The laminar flow found in most microfluidic systems makes them at least theoretically well suited to flow cytometry. In practice, however, emulating the annular design of the traditional cytometers is a difficult fabrication problem.

Some flow cytometers operate by simply filling the whole channel with the sample stream. Optical detection can be problematic in these systems because the cells are evenly distributed in the channel. Reducing the dimensions of the channel makes it easier to focus the optics tightly onto the cells, but also increases the risk of clogging. Light scatter off the walls of the channel is also a problem with these systems. Another flow cytometer operates by confining the flow top and bottom between two hydrophobic PDMS layers, and on the sides by air. A variety of factors effect the size of the "channel," including the hydrostatic pressure and surface tension of the fluid. This system also suffers from the light scattering issues of the previous designs. In addition any contamination of the PDMS surface will change the containment of the solution and may ultimately cause it to fail.

Another flow cytometer system approximates an annular design by focusing the sample stream in one dimension. The sample stream was passed through one arm of a cross intersection while sheath streams are introduced through the two perpendicular arms to laterally constrict the sample stream to the center of the channel. The sample is only confined on the sides, therefore the cells come in contact with the top and bottom of the channel, creating the risk of fouling, and often necessitating the addition of a dynamic coating such as bovine serum albumen, hydroxylpropylmethyl cellulose, or covalent coatings such as trichlorohexadecylsilane. Also, the fact that the cells are distributed vertically means that the optics must have a relatively low numerical aperture, which decreases the amount of light that can be gathered from a single cell and reduces the spatial resolution of the measurements.

Other flow cytometer systems attempt to sheath the sample stream both horizontally and vertically, typically by adding an additional two channels to sheath the stream vertically as well as horizontally. From the standpoint of cytometry, this is a far better situation, because the sample is now completely isolated from the channel walls, and the position of the particles to be analyzed is fixed. Unfortunately, the addition of another set of sheath inputs brings the total number to four. Their relative flow rates must be carefully controlled or the position of the sample stream will drift and the particles will no longer pass through the aligned interrogation region. The best way to ensure even distribution of flow among all the sheath channels is to have a separate pump supplying each stream, but this substantially increases the expense and complexity of the supporting fluidics.

Therefore there is a need in the art for a method and device of providing a sheath flow that fully surrounds the core, can be varied in size, and is easy to manufacture and use for a wide variety of applications.

BRIEF SUMMARY

Streams in microfluidic systems with low Reynolds numbers operate in the laminar flow regime, e.g. there is no turbulent mixing or transport of solutes between the streams other than occurs through diffusion. Provided is a sheath flow method and device comprising a channel having at least one groove in the top and bottom of the channel. Core fluid is introduced into one side of the channel, while sheath fluid is introduced on the other side. The grooves or ridges cause sheath fluid to flow from one side of the channel entirely around the core fluid to the other side of the channel. Thus the core fluid introduced into one side is entirely encircled by sheath fluid introduced into the other side. As disclosed herein, a wide variety of shapes of fibers and other structures can be produced through the use of polymerizable material.

BRIEF DESCRIPTION OF THE DRAWINGS

FIG. 22 shows a simulation of how flow through a 5-chevron device can be used to split a single core into two parallel streams. FIG. 22A shows the model results on the z and y axes while

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a," "an," and "the" do not preclude plural referents, unless the content clearly dictates otherwise.

As used herein, the term "and/or" includes any and all combinations of one or more of the associated listed items.

As used herein, a "core" refers to a fluid flow that is concentrically surrounded by another fluid flow, termed the "sheath." Together the core and sheath flow are referred to as a "sheathed flow." A core may optionally include within it an interior core, so that the interior core surrounded by an exterior portion of the core serving as a sheath. Optionally, the interior core may in turn serve as a sheath to a deeper interior core, and so on. The cores may have differing compositions. As used herein, the term "simple core" refers to a core lacking an interior core.

As used herein, the term "cross-section" refers to cross-sectional shape, area, and/or dimension(s).

Description

In the present device and method, one or more core streams and one or more sheath streams are introduced into a single channel. One or more fluid transporting structures located at the top and bottom of the channel direct the sheath fluid around the core stream, separating the core stream from the walls of the channel. Once the position of the core stream is established in the interior of the channel, it remains in that position due to laminar flow.

Figure 1:
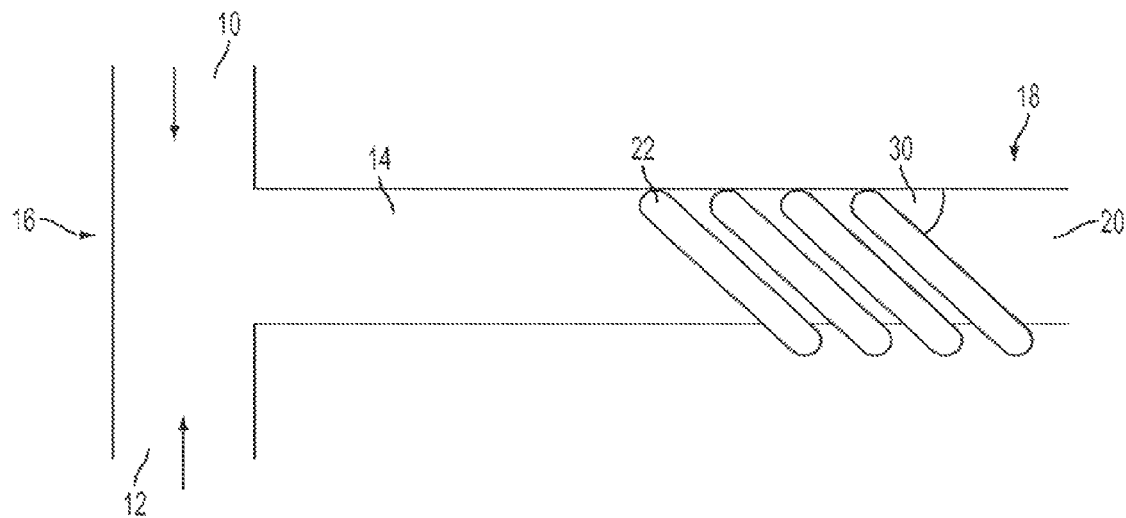
FIG. 1 is a view of one example of a sheath flow device.

FIG. 1 shows a top view of one example of a sheath flow device. A sheath stream inlet 10, and a core stream inlet 12, allow a sheath stream and a core stream to be introduced into a channel 14. One design provides for a at a 'T' intersection at the proximal end 16 of the channel 14. The sheath stream and the core stream flow down the channel side-by-side towards the distal end of the channel 18 where an outlet 20 is present. At least one fluid transporting structure 22 such as a groove or a ridge is located in the channel 14 between the inlets 10, 12 and the outlet 20. The fluid transporting structure 22 transports the sheath stream across the top and bottom of the channel 14 to completely surround the core stream. The fluid transporting structure 22 crosses the channel 14 at an angle 30.

The device can be readily fabricated using a variety of techniques, including molding, milling, laser ablation, soft lithography techniques and other fabrication techniques known to those skilled in the art. Any material that can be machined or molded into the appropriate shapes can be used. The current techniques used in the mass production of microfluidic components can be easily adapted to the production of this sheath flow design.

Figure 2:
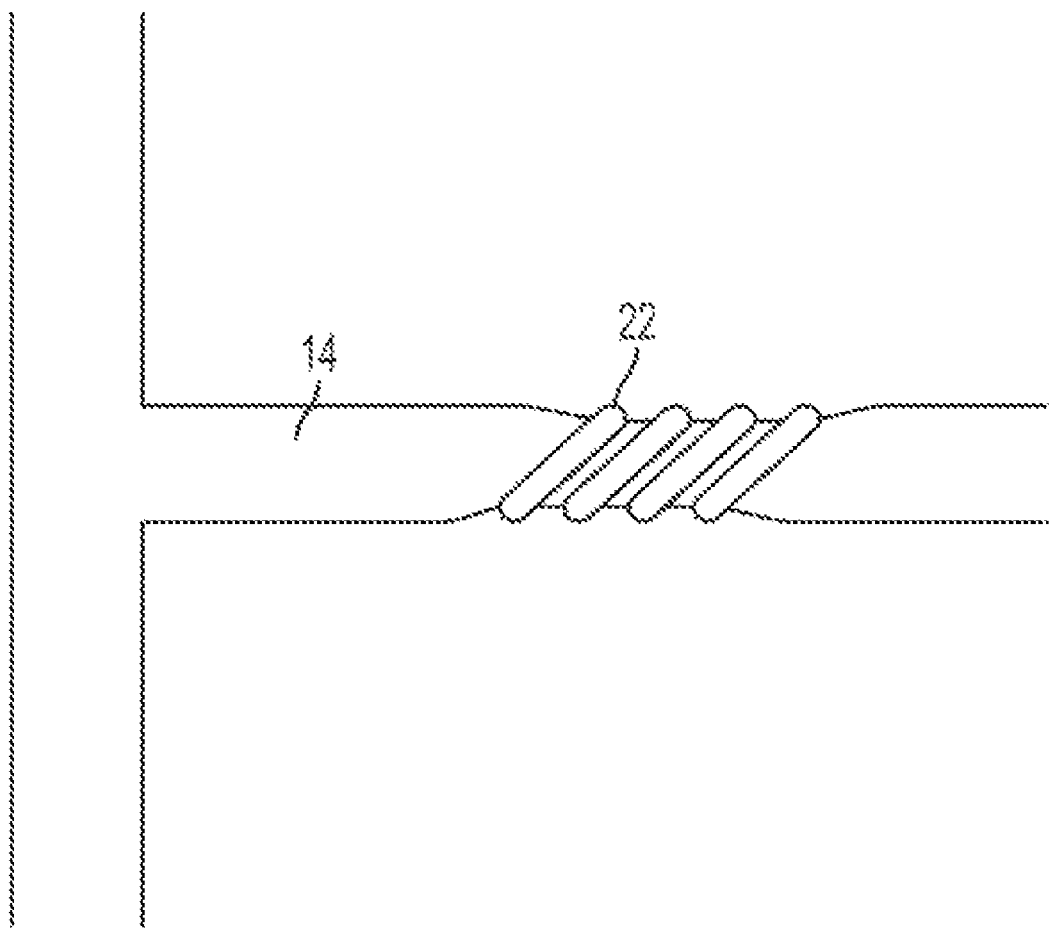
FIG. 2 is a view of one example of a sheath flow device.

The exact shape of the channel is not critical. For example, FIG. 2 shows a channel 14 with a constriction at the location of the grooves 22. The constricted device showed similar behavior to devices without the constriction. The size of the channel can be varied within a broad range of size scales. The size of the channel is limited at the lower end by diffusion. When the width or diameter of the channel reaches the diffusional distance of the molecules or particles of interest, any attempts to confine them to a specific region of the channel will be thwarted.

The upper limit for the channel width is set by the Reynolds number of the system. The device shown in FIG. 1 has been shown to function at Reynolds numbers up to and including 200. This means that the device can be fabricated into larger sizes using slower velocities or higher viscosity fluids. Sheath flow devices have been fabricated for use with high viscosity fluids that are 3 mm in width that have Reynolds numbers of 0.0008, so the actual channel diameter can be significantly wider than that with the use of appropriate fluids. The device will operate at Reynolds numbers up to those at which turbulence is initiated.

The channel has at least two inlets at or near its proximal end. The inlets are used to introduce a sheath stream and a core stream into the channel. The size and exact location of the inlets are can be varied, provided that the fluid transporting structure in the channel is located downstream from the inlets.

The at least one fluid transporting structure is typically a groove or a ridge located inside the channel. The structure transports the sheath stream laterally across the channel and around the core stream, separating the core stream from the walls of the channel. Once the position of the core stream is established in the interior of the channel, it remains in that position due to laminar flow. The angle of the fluid transporting structure across the channel is not necessarily critical to the design, however it has been found to be important in applications involving shaping of the core. FIG. 1 shows a device having a fluid transporting structure 22 that has an angle 30 that is about 45° relative to the channel; however, other oblique angles will work as well.

Figure 19A:
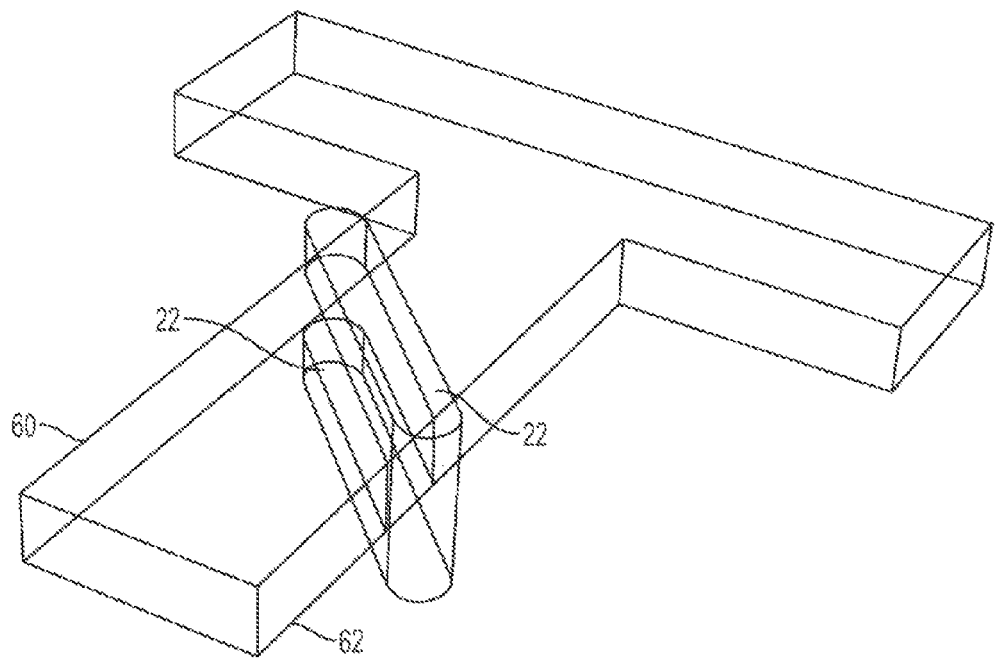
FIG. 19a is view of one example of a sheath flow device showing fluid transporting structure across the top surface and a second fluid transporting structure across the bottom surface.
Figure 19B:
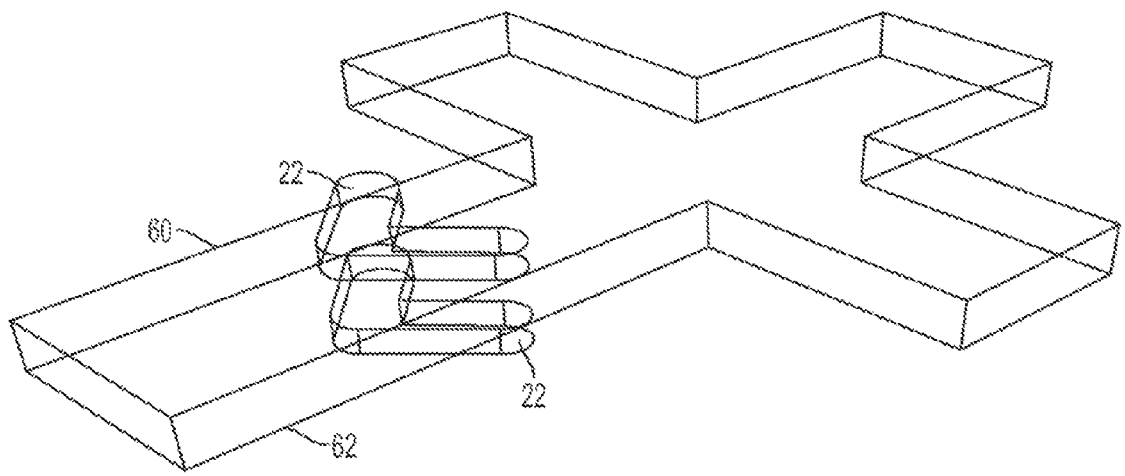
FIG. 19b is view of one example of a sheath flow device showing fluid transporting structure across the top surface and a second fluid transporting structure across the bottom surface.

The number and depth of the fluid transporting structures are design parameters that also can be adjusted to suit particular applications. A single structure located on the top and bottom of the channel will provide for a full sheath around the core stream. The grooves do not have to be precisely aligned along the flow axis in order for the device and method to operate. However, their lateral alignment may be important. Increasing the number of fluid transporting structures provides control over the lateral position of the core within the channel. Increasing the size of the fluid transporting structures correlates with a more effective transport of the sheath stream across the channel. Preferably, the fluid transporting structures penetrate the wall of the channel on the downstream end. FIG. 1 shows the fluid transporting structures 22 penetrating the wall of the channel 14 on the downstream end. This penetration increases the effectiveness of the fluid transport to better encase the core stream in the sheath stream. Sheathing will occur, however, even if the fluid transporting structure does not penetrate the channel wall. FIGS. 19a and 19b show a two embodiments of the present sheath flow device having a first fluid transporting structure 22 located across a top surface 60 of a channel and a second fluid transporting structure 22 located across a bottom surface 62 of a channel.

Example

Figure 3A:
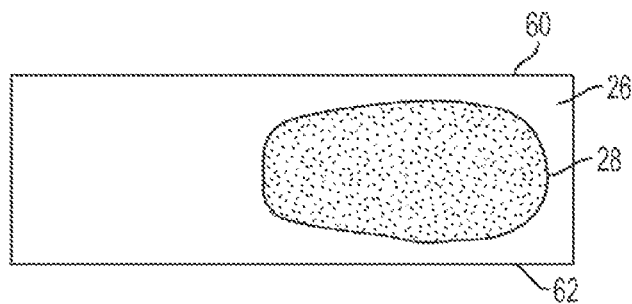
FIG. 3 is a series of representative cross sections of sheathed flow.
Figure 3B:
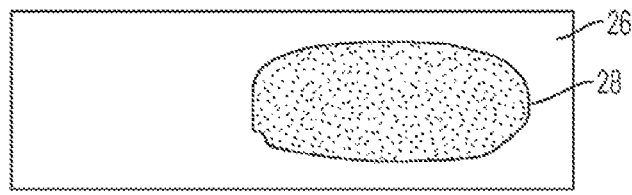
Figure 3C:
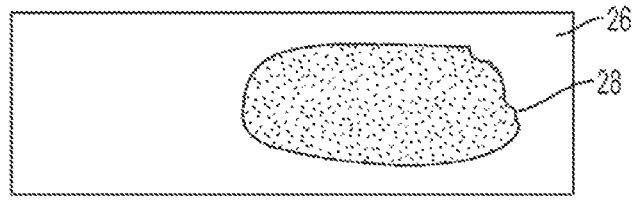
Figure 3D:
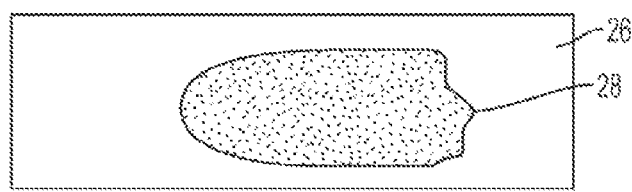
Figure 3E:
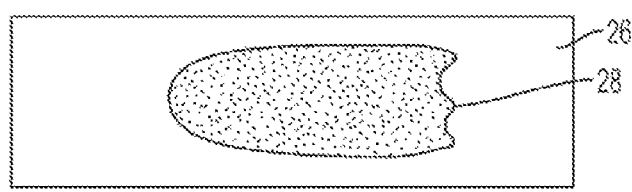
Figure 3F:
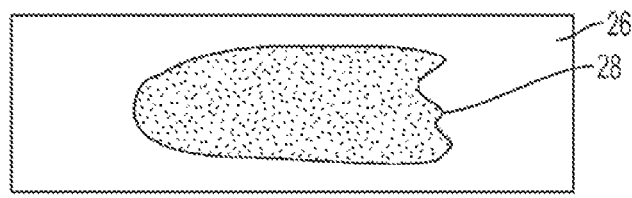

The number of grooves can be used to control the position of the core within the channel. FIGS. 3(a) through 3(f) show the cross-sections resulting from a sheath flow device having 1 pair of grooves through 6 pairs of grooves, respectively. One pair of grooves is sufficient to completely surround the core stream 28 with sheath stream 26. FIG. 3(a) illustrates the top surface 60 of the channel and the bottom surface 62 of the channel. Subsequent pairs carried more sheath fluid to the right, causing the core to be shifted leftward. Having four pairs of grooves appears to be sufficient to place the core roughly in the center of the channel. Depending on the relative flow rates of the two fluids, the core can be made as small as 1% of the total channel cross-section. It is also possible to make the core quite large without losing the sheathing effect.

Figure 4:
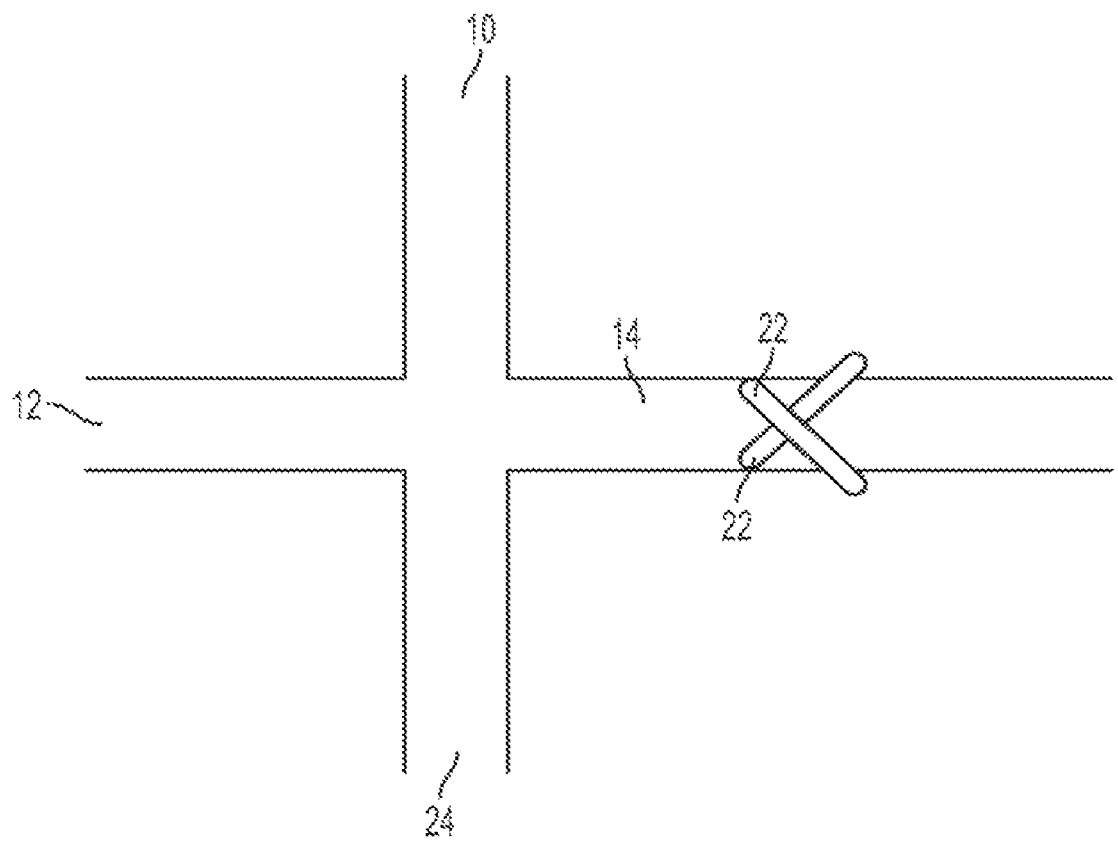
FIG. 4 is a view of one example of a sheath flow device.

The fluid transporting structures may also be used in a cross configuration when sheath solution is provided from both sides by a third inlet. FIG. 4 shows a channel, 14, having a first sheath stream inlet 10 and a second sheath stream inlet 24. The core stream inlet 12 is located between the first and second sheath stream inlets. A first groove 22 located in the top of the channel moves sheath stream from the left of the channel across the top. An opposing groove 22 located at the bottom the channel in a cross configuration with the first groove moves solution from the right of the channel across the bottom. This design has the advantage that the centroid of the core remains stationary, even when the relative flow rate of the core solution is varied. Additionally, the first and second sheath stream inlets allow differing sheathing materials to be introduced into the channel.

Figure 5:
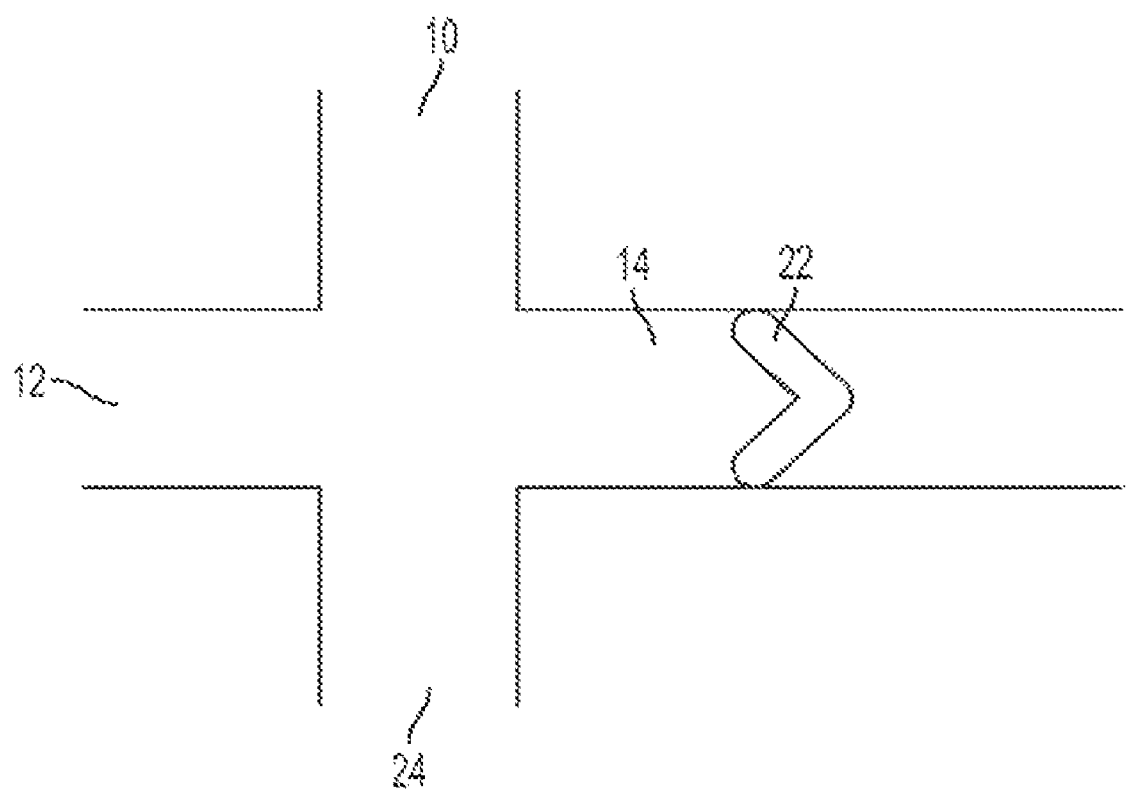
FIG. 5 is a view of one example of a sheath flow device.

Further, the fluid transporting structures located on the top and bottom of the channel may be configured in a shape that crosses the channel having a central area that is distal to its ends, as show in FIG. 5. The fluid transporting structure 22 of FIG. 4 is shown as a "v" shape, however, any shape having a central area that is located distally in the channel to its ends would work, such as a semi-circle. FIG. 4 shows a channel, 14, having a first sheath stream inlet 10 and a second sheath stream inlet 24. The core stream inlet 12 is located between the first and second sheath stream inlets. Fluid transporting structures 22 located in the top of the channel moves sheath stream across the core stream to sheathe the core stream.

Example

A microfluidic chip was made using a Techno-isel CNC milling router (Techno Inc., New Hyde Park, N.Y.) in poly (methylmethacrylate) (PMMA) (Plexiglas G, Atofina Chemical Inc., Philadelphia, Pa.) via a method described by Howell, et al, Lab on a Chip 2005, 5, 524-530, Howell, et al, Lab on a Chip 2004, 4, 663-669, and Mott, et al, Lab on a Chip 2006, 6, 540-549, all incorporated in full herein by reference. The main channel was 3.18 mm wide by 1.02 mm deep. The grooves were 0.794 mm wide by 0.51 mm deep, and placed in pairs on both the top and bottom of the channel. A 70% fructose solution was used as core and the sheath solutions to ensure that the flow within the channel stayed in the Stokes regime. The sheath stream was labeled with fluorescent dye (Rhodamine WT, Bright Dyes, Miamisburg, Ohio). Channel cross-sections downstream of the grooves were obtained via a method described previously by Howell, P. B. et al, Lab on a Chip 2005, 5, 524-530 and Mott, et al, Lab on a Chip 2006, 6, 540-549, both incorporated in full herein by reference.

Figure 6:
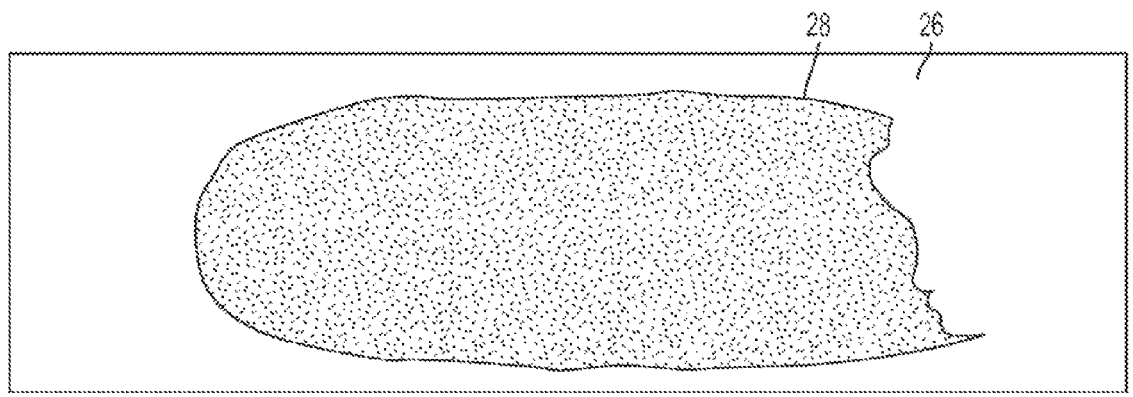
FIG. 6 is a representative cross section of sheathed flow.
Figure 7:
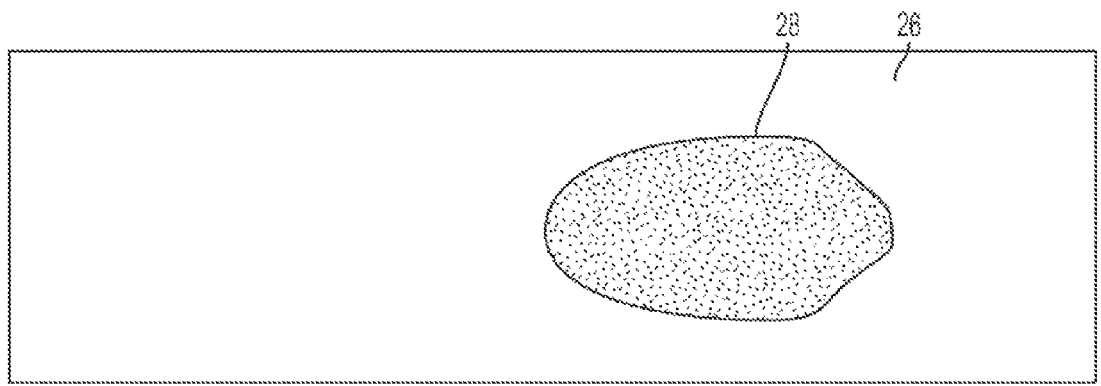
FIG. 7 is a representative cross section of sheathed flow.
Figure 10:
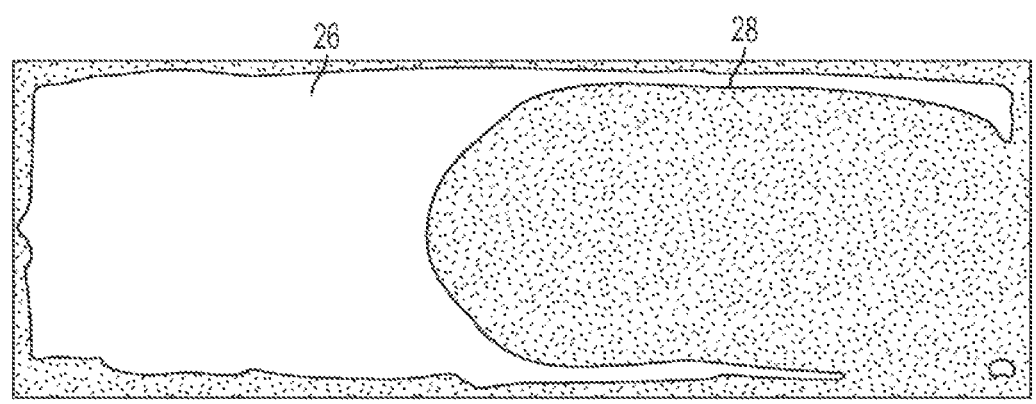
FIG. 10 is a representative cross section of unsheathed flow.

The relative flow rate of the two streams can be widely varied without compromising the integrity of the sheath. FIG. 6 demonstrates a core-to-sheath ratio of 4:1. While the volumetric flow rate of the sheath stream 26 constitutes just 20% of the channel, it still completely surrounds the core stream 28. FIG. 7 demonstrates that a core-to-sheath ratio of 1:4.

continuous monitoring on a space station or other enclosed environment. It would also be useful where the solute or particles in the core solution were very precious and recapture is important. FIG. 10 shows the sheath stream 26 and the core stream 28 after unsheathing.

Figure 8:
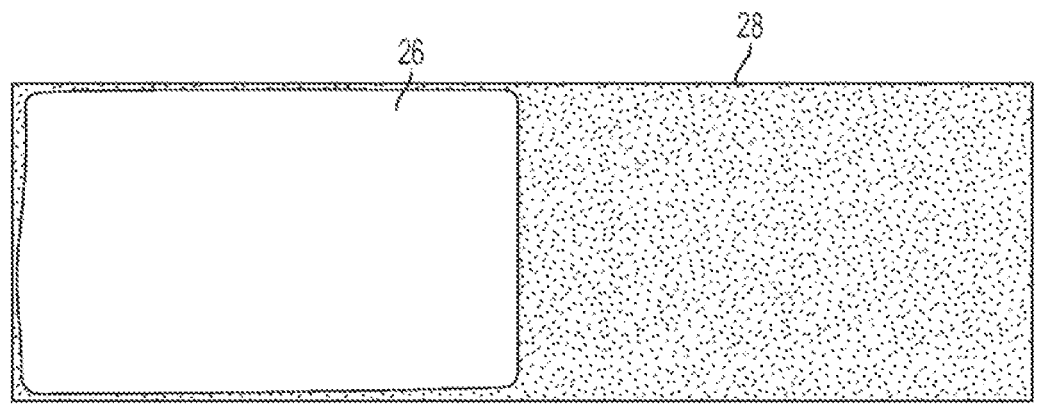
FIG. 8 is a representative cross section of sheathed flow.
Figure 9:
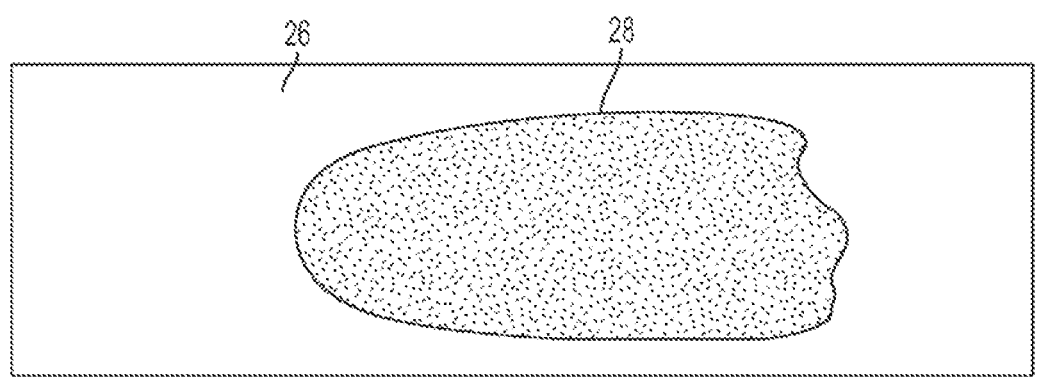
FIG. 9 is a representative cross section of sheathed flow.

The diameters of the sheath and core can vary widely depending on the intended use of the device. FIGS. 8-10 show cross sections of a sheath flow system where the flow rate of the sheath stream is approximately the same as that of the core fluid and the sheath and the core have similar cross sectional areas. FIGS. 11 *a-c* show systems in which the relative flow rates of the core stream 28 and sheath stream 26 are adjusted so that the core diameter is very small compared to the sheath (<16 micron core compared to 3 millimeters sheath).

Using specific variations in the pattern of grooves, the exact location of the core stream can be also be moved across the channel. The capacity either to separate the walls of the channel from the core fluid using a minimum of sheath fluid or to focus the core fluid in a well defined region within the channel are significant advantages of the sheath flow device and method.

Figure 11A:
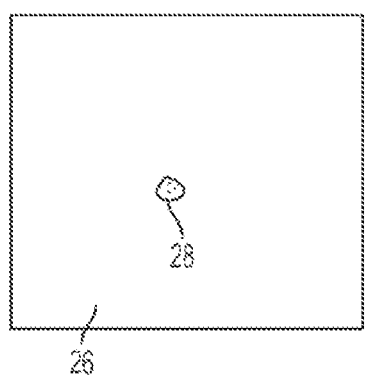
FIG. 11 is a series of representative cross sections of sheathed flow.
Figure 11B:
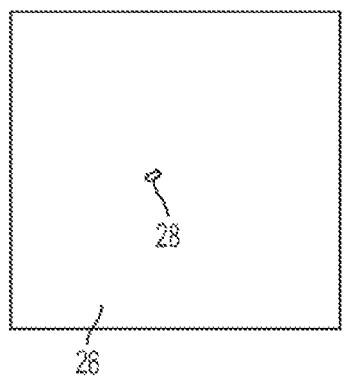
Figure 11C:
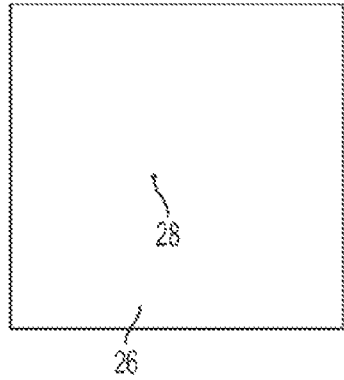

Furthermore, the relative flow rates of the core and sheath can be changed at will and the diameter of the core can be varied in real time if the application warrants, with no need to alter the device itself. As shown in the data in Table 1, the sheathing process remains unperturbed, even at sheath/core ratios over 40,000. FIG. 11*a* shows a core/sheath ratio of 2,100. FIG. 11*b* shows a core/sheath ratio of 21,000. FIG. 11*c* shows a core/sheath ratio of 42,000. Higher resolution microscopes would enable viewing of fluorescence from the core for even smaller core diameters.

TABLE 1

| Reynolds Number | Sheath Flow Rate | Sheath Diameter | Core Flow Rate | Core Diameter | | Ratio of Core/Sheath |
|---|---|---|---|---|---|---|
| | | | | Calculated | Measured | |
| 0.0008 | 21 mL/min | 3 mm | 10 µL/min | 45 microns | 75 microns | 2,100 |
| 0.0008 | 21 mL/min | 3 mm | 1 µL/min | 4.5 microns | 25 microns | 21,000 |
| 0.0016 | 42 mL/min | 3 mm | 1 µL/min | 3 microns | 16 microns | 42,000 |

While the core stream 28 has been reduced to 20% of the net flow compared to the sheath stream 26, it is still clearly defined. For the specific device and method used in the example, a stable, fully enveloped sheath flow for Reynolds numbers of up to approximately 200 was generated before the limits of the pump were reached.

FIG. 8 shows a typical cross-section of the channel before sheathing. Sheath stream 26 and core stream 28 are side by side in the channel. FIG. 9 shows the sheath stream 26 surrounding the core stream after passing the fluid transporting structures, not shown. Fluorescent dye can be added to either the sheath stream or the core stream to provide contrast. Unlike other sheath flow systems, this device has also been shown to be reversible. It is possible to unsheathe a sheathed flow to recapture both the core and the sheath with high efficiency. Unsheathing is achieved by providing a second fluid transporting structure located proximally in the channel from the first fluid transporting structure. The second fluid transporting structure is arranged with a reversal of direction as compared to the first fluid transporting structure. The second fluid transporting structure does not have to be arranged to be the exact reverse of the first fluid transporting structure, however, the orientation is in the opposite direction from the first. The ability to unsheathe a sheathed flow can be useful in systems where the sheath solution is in limited supply and the capability of recycling the flow is advantageous, such as The actual size of the core can be changed relative to the size of the channel by simply altering the relative flow rates of the core and sheath streams. Furthermore, this change can be effected in real time. Unlike nozzle system traditionally used for flow cytometry or extrusion, there is no need to go to smaller and smaller nozzles which may result in clogging problems, higher back pressures, and reduced output. In previous designs, the core solution must pass through a nozzle or other constriction to enter the flow. This presents a potential clogging point, for the solution containing the cells or other particles to be analyzed. Under the present design, channels can be of uniform size to avoid constrictions and potential clogging points.

Using the device and method described herein, microdialysis could be accomplished without a membrane. The core stream is recaptured after it is exposed by sheathing to the sheath stream. This exposure provides for the removal of low molecular weight molecules by diffusion across the interface of the core stream and the sheath stream. The ability to conduct microdialysis without a membrane prolongs the life of the system. Current microdialysis systems operate for limited lifetimes due to the potential for membrane clogging. Additionally, separations based on differential solubility as well as differential size can be provided by the device and method described herein. For example, a whole blood sample could be sheathed into the center of the channel, and allowed to flow for sufficient distance for small molecules to diffuse outward from the core into the sheath. Cells and larger molecules such as proteins will not diffuse as quickly and will tend to stay in the core. The core would then be unsheathed and recovered, with the smaller molecules removed.

The device and method are useful as a means of protecting conduits, including but not limited to, pipes, tubes, ducts, tubing, capillaries, and microfluidic channels, from fouling or corrosion. A thin sheath stream of protective material is formed around the core stream. The sheath stream need not be the same viscosity as the core stream, therefore a relatively slow moving and thin protective sheath coating can be formed to protect the insides of conduits exposed to corrosive core stream solutions.

The device and methods described herein can also be used to reduce the power requirement for transporting viscous fluids in conduits, including but not limited to, ducts, pipes, tubes, tubing, capillaries, and microfluidic channels. Sheathing a viscous fluid in a second fluid of lower viscosity reduces the sheer stress at the conduit wall which lowers the pressure drop required to generate a given flow rate. The sheath flow component has been used to generate such a flow, in which a core and a sheath stream of differing viscosity initially enter the device side-by-side and the lower viscosity sheath stream sheaths the higher viscosity core stream.

The relatively low flow resistance of the device means that it can be used to sheath quite high-viscosity systems. This is useful in food and polymer extrusion applications. The device and method is further useful in the synthesis of specialty polymeric filaments and tubes. Unlike standard extrusion technologies, filaments with continuously varying diameter can be created. Filaments made in this way can be expected to have increased elasticity over extruded filaments because of the native entropy of the polymer chains. The exact design may also be altered to change the cross-sectional shape of the resulting polymer strand. Since the extrusion device is small, inexpensive, and essentially operates as a passive component, many devices can be fabricated to perform in parallel, such as an array.

The device and methods described are also useful as liquid waveguides. Liquid waveguides have been described for monitoring chemical processes in which light is guided in fluid in a capillary or in the walls of a capillary in order to measure some component of the fluid. The device and method can be used for guiding the light in either the core stream or sheath stream for similar measurements, but with the capability for more exact focusing, much greater control of the relative dimensions of the light guiding fluid and the other fluid, and the avoidance of wall effects such as scattering of the light from the core by the capillary wall. The capability of guiding light in fluids is particularly useful in microfluidic systems.

Figure 12:
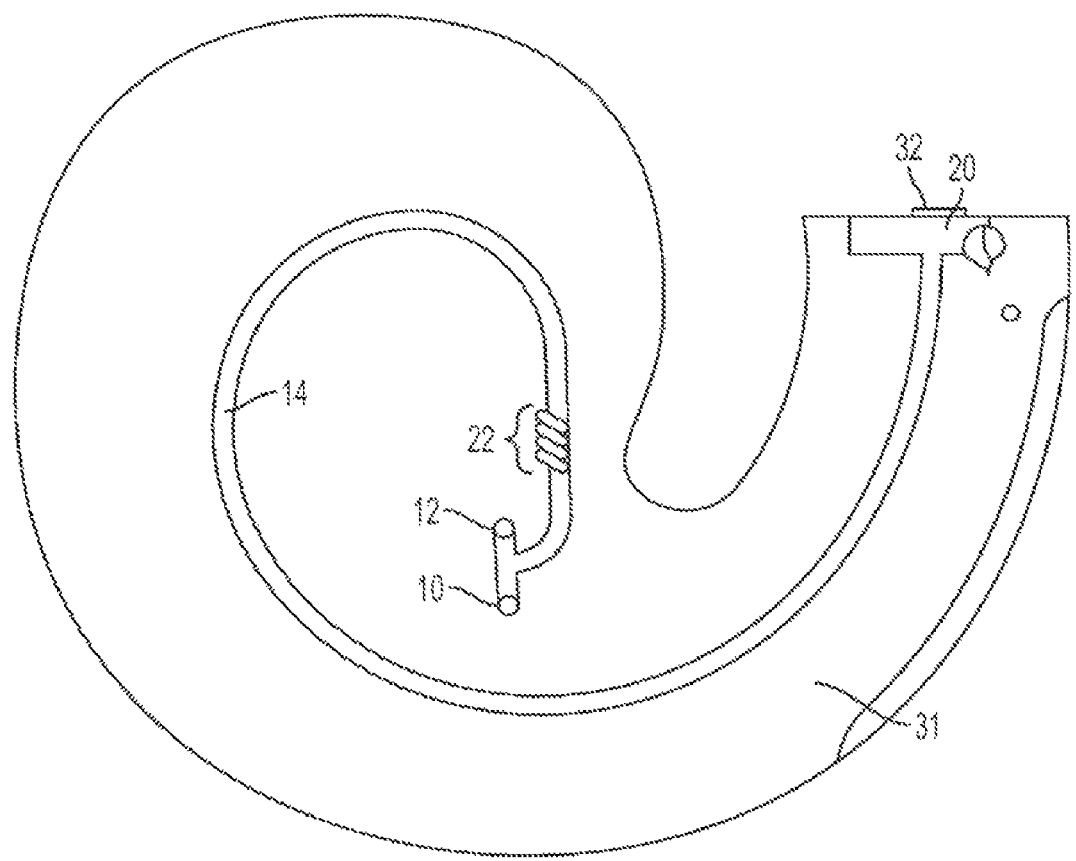
FIG. 12 is a liquid waveguide device.

FIG. 12 shows the waveguide application. A chip 31 was fabricated with a channel 14 beginning in the center and spiraling outward to the outlet 20 on the outside edge of the chip. A sheath stream inlet 10 and a core stream inlet 12, located near the center of the chip, are in fluid connection with the channel 14. The fluid transporting structures 22 sheathe the core stream within the sheath stream. The sheathed solution then travels outward in a spiral of 360 degrees before reaching the outlet 20. A light source 32 is introduced through a window (not shown) located at the outlet 20.

Core and sheath streams are introduced into the structure at the inlets. The core and sheath streams have approximately equivalent densities. The core stream is 70% fructose. The sheath stream is a saturated salt solution with enough fructose added to match the density of the core. There is a small amount of fluorescent dye in the sheath stream. The sheath was formed in the center of the chip 31 and then traveled outward along an increasing spiral.

Figure 13:
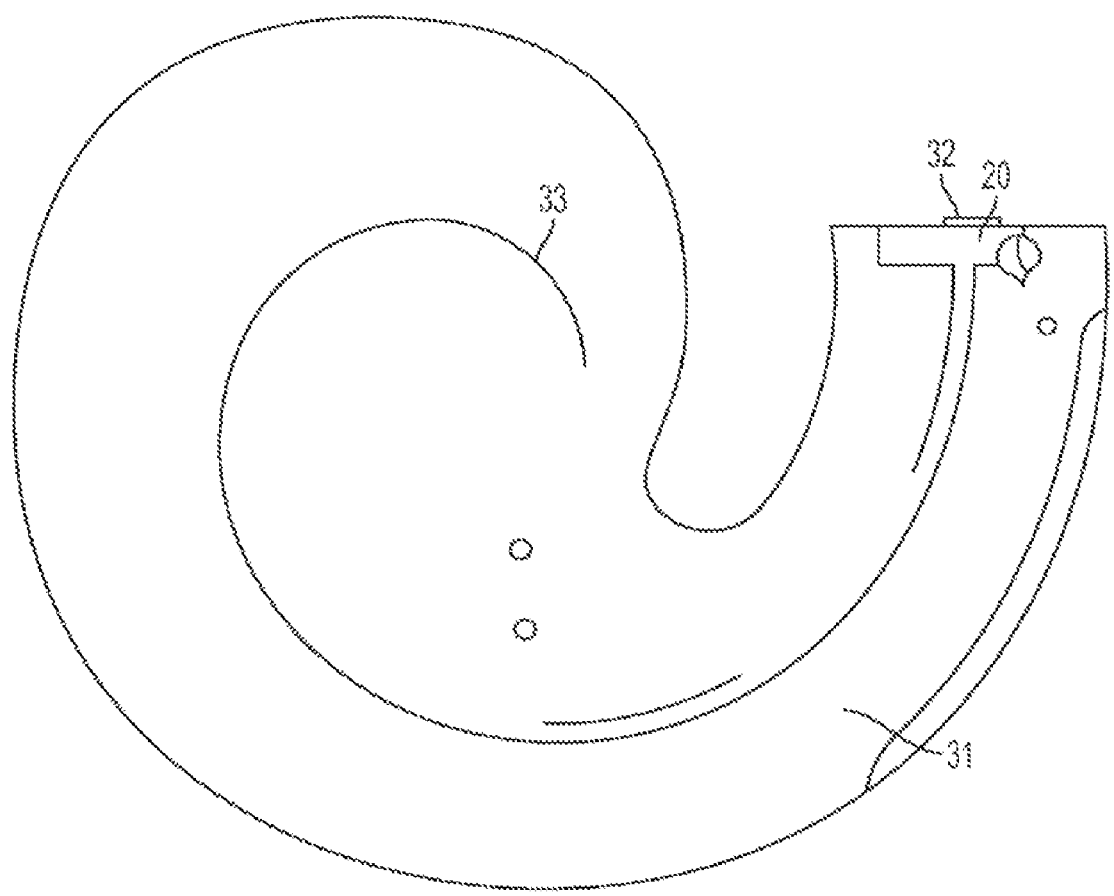
FIG. 13 is a representation of waveguided light though a liquid waveguide.

FIG. 13 shows the resulting waveguided light 33 when light was introduced to the channel from an outlet 20. The light is waveguided 33 through a full 360 degrees around the spiral. The light source 32 illuminates the higher refractive index stream, which in this case is the core; however, it could be either the sheath stream or the core stream.

Figure 14:
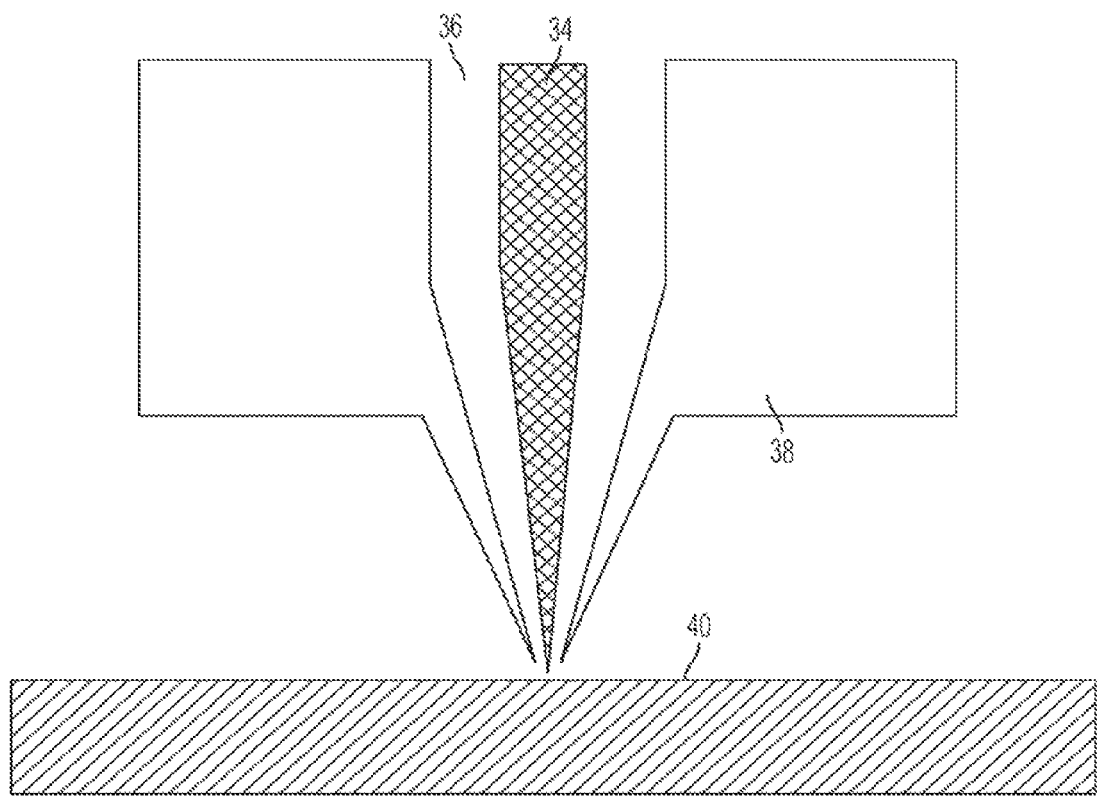
FIG. 14 is a near field microscope.

The condition for waveguiding is merely that the core stream and the sheath stream have different refractive indices. The ability to hydrodynamically focus a core down to submicron diameters allows for the production of a nearfield optical microscope probe entirely out of liquid. FIG. 14 shows an example of a nearfield optical microscope utilizing the present invention. Once the core stream 34 is ensheathed in the sheath stream 36, a tapered nozzle 38 is used to create the taper in the core. The high refractive index core stream 34 is directed through the nozzle 38. Light introduced into the core will be waveguided down to the surface 40. Reflected, scattered, or emitted light will then be collected by the waveguide and carried upward for detection. Another possible design may eliminate the need for a nozzle by introducing dielectrophoretic forces to push the core stream out into a fine tip. This design would also be able to use dielectric forces to steer the stream and raster it over the surface. Based on refractive index measurements of the chosen chemistry, the optimal geometry of the taper can be established. Because a solid tip does not have to be brought into close proximity with the surface, this design is well suited for the analysis of fragile biological samples. It is also well suited to perform liquid-phase photochemistry for nanomachining processes. The chip is able to raster over a surface using a translation stage.

The device and method of the present invention are useful in particle counting and flow cytometry. Flow cytometry has proven to be an effective tool for highly multiplexed screening of environmental samples in an automated format for continuous monitoring. Systems currently in use include the Luminex® flow cytometer, which is relatively large and requires a significant volume of water for sheath fluid—a primary factor limiting the time of continuous operation to one week. Furthermore, in case of a positive result, a separate aliquot of the sample must be analyzed for agent confirmation; thus all samples must be divided and temporarily archived prior to cytometry.

The flow cytometer system of the present invention is useful for continuous monitoring for biological warfare contaminants in air or water. The flow cytometer system is typically provided on a microfluidic chip, and is comprised of a sheath flow device and an interrogation region. The sheath flow device is used to introduce the core and sheath streams into a microfluidic channel in such a way that the sheath stream completely surrounds the core sample stream, thus preventing fouling of the microfluidic channel where the top and bottom of the core sample stream would have touched the channel walls and completely focusing the stream within the interrogation region. Optionally, the sheath and core stream can be separated after the analysis so that each can be separately recaptured and the sheath fluid reused. The use of the microfluidic flow cytometer and sheath fluid recapture will significantly reduce the footprint of the monitoring system.

The optical interrogation region is comprised of at least one waveguide, which is composed of a photoresist material that is integrated onboard the microfluidic chip for delivery of excitation light at two different wavelengths and collection of signal for analysis of 3-color fluorescence emission and light scatter. Coded Luminex® beads provide the multiplexing capability.

On-chip optical analysis was performed on the core stream using a diode laser with pigtailed optical fibers to illuminate the core stream. Light scatter at 90° was measured to detect the passage of yeast cells through the illuminated region of the core. Signal tracings, representing the light scatter signal from five-fold serial dilutions of yeast cells, demonstrated that the light scatter signals were proportional to the concentration of cells in the flow stream.

The addition of optical elements measuring fluorescence to a flow cytometer on a chip is straightforward using methods and devices known in the art, such as optical fibers or polymer waveguides and light sources and filters of the appropriate wavelengths. The types of fluorescence analyses using dyes and labeled binding molecules that can be performed are described extensively in literature using commercial flow cytometers and are well known in the art. In general, the number of analytes that can be analyzed simultaneously is a function of the number of labels that can be excited and discriminated. However, one approach that enables the performance of highly multiplexed assays relies only on three-color discrimination. A commercially available version of this approach for flow cytometry uses coded beads.

Luminex coded beads are prepared so that two colors of fluorescence are emitted when the bead is excited using a red laser. The ratio of the two colors indicates the identity of the bead. If target is bound to the bead, that bead can be distinguished from beads with no target bound by the formation of a complex with another antibody labeled with a third fluorescent label (dye, quantum dot, fluorescent nanoparticle) excited using a green laser.

Recovery of the particles producing a positive signal is desirable in order to confirm that the positive result was indeed caused by the toxin or pathogen presumed present according to the results of the screening immunoassay. Analysis of a separate aliquot inevitably assumes that the composition of the tested and archived sample fractions is identical—which might be questionable for very low concentration of agent. Therefore a means for sorting can be included in the microflow cytometer device that can provide the ability to sort particles of interest into an on-chip collection chamber to reserve them for further analysis.

The core and sheath streams are first introduced to the same channel from a 'T' intersection so that they are flowing side-by-side. A series of grooves placed in the top and bottom of the channel then serve to completely wrap the sheath stream around the core. The sheath fluid becomes entrained by the grooves and travels above and below the core stream to completely surround it.

Example

A flow cytometer was made using soft lithography in a 3 mask process. The channels were assembled from two pieces that were mirror images of each other. To produce the template, a 35 micron layer of SU-8 was first spun onto a silicon wafer and exposed with the mask defining the 200 micron wide fluid channels. Then a second 30 microns layer was spun on and exposed with the second mask, defining the grooves. Finally a third mask was used to expose both layers and define the channels to hold the optical fibers.

When baked and developed, only the exposed portions of the SU-8 remained. This created a negative master of one half of the channel. The negative masters were then used to cast Sylgard-184 (Dow-Corning) into the two halves of the chip. When the two halves were aligned and brought together, the result was a 70 micron deep fluid channel with 30 micron deep grooves placed in the top and the bottom. The fiber channels were 130 micron deep because both layers of SU-8 were exposed. This was sufficient to accommodate the 130 micron OD optical fibers.

The chips have two inlets. The inlet and outlet ports were made in the bottom piece of PDMS with an 18-gauge needle. Fluidic connections to the chips were provided via a PMMA base made using a CNC mill. The base had a set of ports on the face that could be aligned with and pressed against ports of the chip. A set of internal channels connected these ports with short lengths of stainless steel tubing along the edge of the base. These could be used as friction connections to silicone tubing, which was connected to syringe pumps (Cole-Parmer, Vernon Hills, Ill.).

Chip assembly required careful alignment of the two halves. The presence of the fiber channels assisted with the alignment. As a first step, the bottom piece was placed on the base and the ports on the chip were aligned with the ports on the base. Then the fibers were positioned in the fiber channels. A single-mode fiber was used for illumination and a multi-mode fiber was used to collect the scattered light at 90 degrees. The base of each fiber was held in place with tape so that it would remain in the channel. A small amount of ethanol was then placed on the bottom piece and the top piece positioned on top. The ethanol prevented the immediate adhesion of the two pieces of PDMS. The two pieces "clicked" together and were aligned to within about 20 microns, due to the fibers locking into the fiber channels. A glass slide was then placed over the top piece and weak lateral pressures were applied until the two pieces were completely aligned. The chip was then left until the ethanol evaporated and the adhesion between the two PDMS pieces was fully developed. A small amount of Sylgard-184® was then applied to the end of each fiber channel and allowed to wick in around the fiber and form a complete seal.

Figure 15:
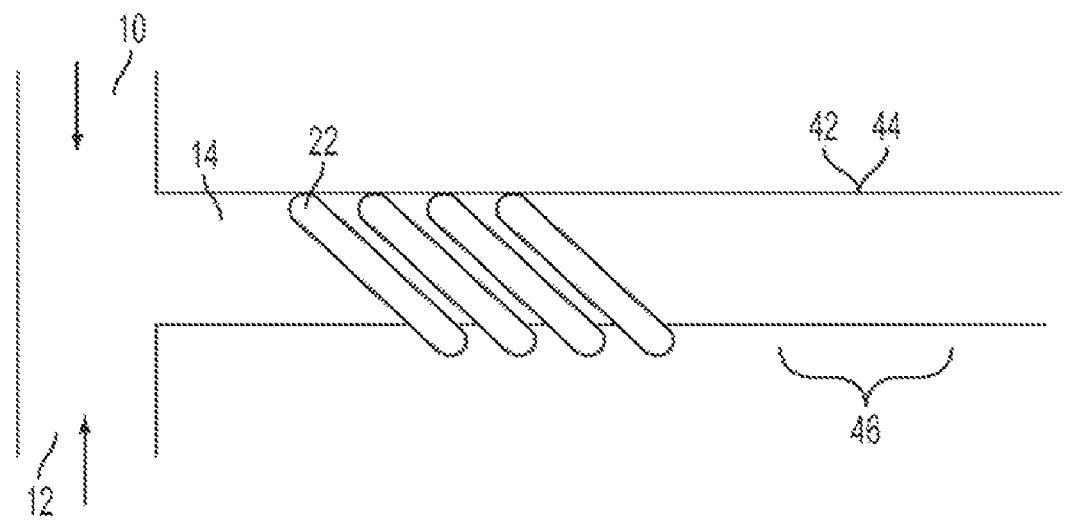
FIG. 15 is a flow cytometer device.

FIG. 15 shows the flow cytometer. The inlets 10, 12 are connected to the channel 14. The fluid transporting structures 22 wrap the sheath stream around the core stream, focusing the core stream in the interrogation region 46. Interrogation, for example, illumination, comes from a single mode fiber 42. Light was collected by a multimode fiber 44.

On-chip optical analysis was performed on the core stream using a diode laser with pigtailed optical fibers to illuminate the core stream. Light scatter at 90° was measured to detect the passage of yeast cells through the illuminated region of the core. A series of sample suspensions were made having concentrations of 222, 41.5, 7.44, 1.66, and 0.313 ppm of Yeast (Fleishmann's active dry) in phosphate buffered saline containing 0.01% Tween-20. The sample solutions were introduced into the cytometer. The volumetric flow rates of the sample and the sheath were the same.

Figure 16A:
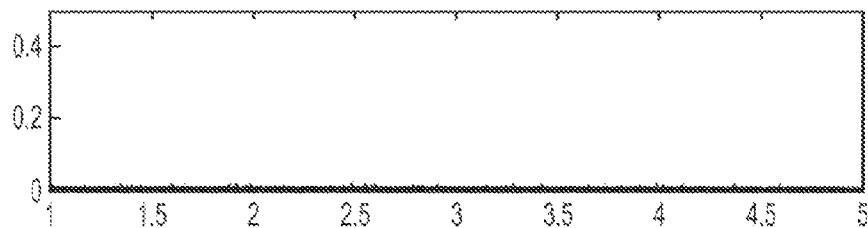
FIG. 16 shows the results of tests using the flow cytometer device.
Figure 16B:
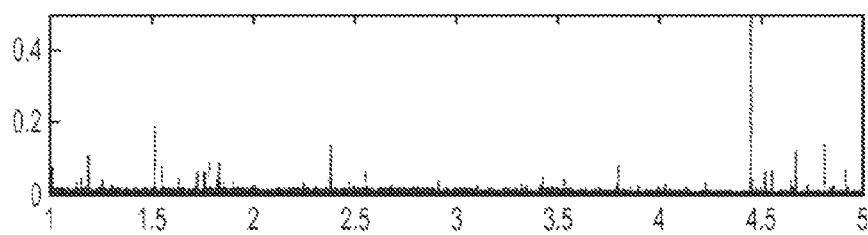
Figure 16C:
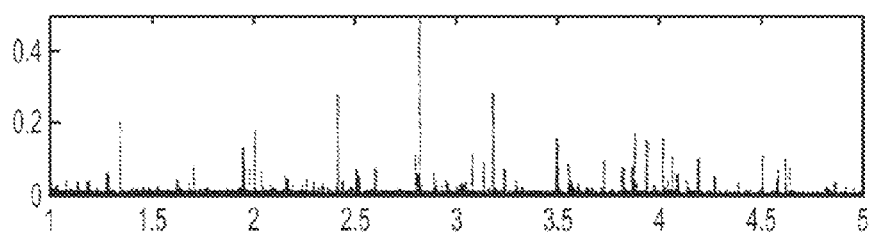
Figure 16D:
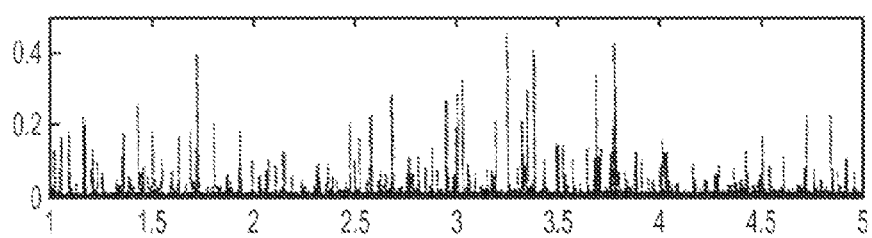
Figure 16E:
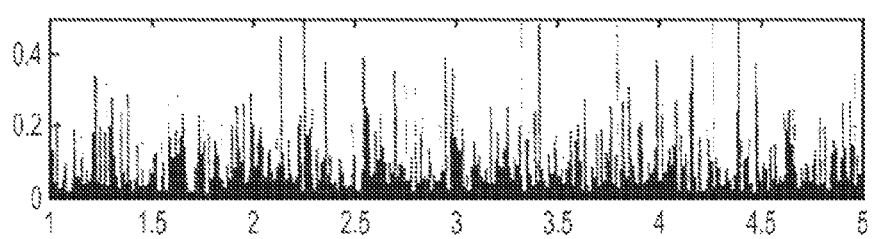

FIGS. 16(a)-16(e) show a series of traces of the light scatter resulting from the series in order of increasing concentration. As shown in the signal tracings, representing the light scatter signal from five-fold serial dilutions of yeast cells, the light scatter signals were proportional to the concentration of cells in the flow stream. The sample core was illuminated with the light from a helium-neon laser introduced via a single mode optical fiber. Scattered light was collected at 90 degrees using a multimode fiber and detected with a photomultiplier tube. FIG. 16a was a highly diluted sample, showing no cells during the 4-second sampling time. Each successive solution was roughly 5 times as concentrated as the previous solution.

Each of the spikes seen in a plot represents the passage of a cell through the interrogation region. The number of spikes increases approximately 5-fold with the 5-fold increase in concentration.

The device and method of the present invention are also useful for the fabrication of materials. For example, the core stream can contain a polymerizable, condensable, cross-linkable or crystallizable material, which is extruded to the desired diameter using the sheath stream instead of a solid nozzle or channel. Since the flow cytometer device is small, inexpensive, and essentially operates as a passive component, many devices can be fabricated to perform in parallel, such as an array.

Materials from which structures can be fabricated include but are not limited to a wide variety of polymers including polystyrene, butyl rubber, polypropylene, polyacrylamide, polysiloxane, and polymethylmethyacrylate. Biological molecules can be ordered to self assemble into higher order structures; such molecules could include a wide variety of lipids, proteins, carbohydrates and oligonucleotides. Materials that form harder structures could be used including precursors of glassy materials such as sol gels, as discussed in Sousek et al., Polymers for Advanced Technologies, 2005, 16:257-261, incorporated herein in full by reference, or initiators for subsequent deposition of metals, calcium, and/or semiconductors. The fluids used can be aqueous or organic. Preferably, the core and sheath fluid are the same phase.

By varying the diameter of the core, tapered materials can be fabricated. Nonuniform or tapered geometries for waveguides can be generated. Controlling the relative rates of sheath and core flow during polymerization of filaments provides high precision, tapered structures with sub-micrometer diameter fluctuations, resulting in unique waveguiding properties.

The device and method is further useful in the synthesis of specialty polymeric filaments and tubes. Unlike standard extrusion technologies, filaments with continuously varying diameter can be created. Filaments made in this way can be expected to have increased elasticity over extruded filaments because of the native entropy of the polymer chains. The exact design may also be altered to change the cross-sectional shape of the resulting polymer strand.

By configuring the grooves or ridges used to transport the sheath stream, non-round shapes can also be obtained. In addition to varying the rate of flow to change the diameter of the core, the core fluid can be pulsed instead of flowed continually to stop and start the core stream to form "particles" or "packets" of core fluid. Once the desired size and shape are obtained, the material in the core is polymerized, condensed, cross-linked, or crystallized chemically, optically or by other means known in the art. Due to the geometry of the system, this type of synthesis can be conducted in continuous manner rather than in batches. Moreover, the geometry of the system is particularly amenable to the production of high-aspect-ratio structures and filaments that are especially difficult to produce in quantity.

Shapes that can be fabricated in this method include, but are not limited to, ovals, ribbons, rods, wires, tubes and filaments. Using the grooves or ridges on the top and bottom of the channel can be specifically designed to produce the desired shape. The grooves or ridges do not have to be straight but can have a variety of configurations as long as they channel the fluid around the core. They can be curved, in the shape of chevrons, angled like "check marks," or in a variety of other shapes in order to influence the shape of the resultant core fluid. The addition of more inputs and grooves further downstream can be used to expand the repertoire of shapes that can be fabricated.

More complex shapes that can be designed and fabricated using grooves or ridges include hollow cylinders, filled "sausages," coated particles, and rods with alternating composition, also known as "nano bar codes". Structures with longitudinal or lateral density or chemical gradients can be fabricated by introducing gradients into one of the flow streams (longitudinal) or by allowing a reactant to diffuse in or out of the core while it is in contact with the sheath stream (lateral).

Figure 17:
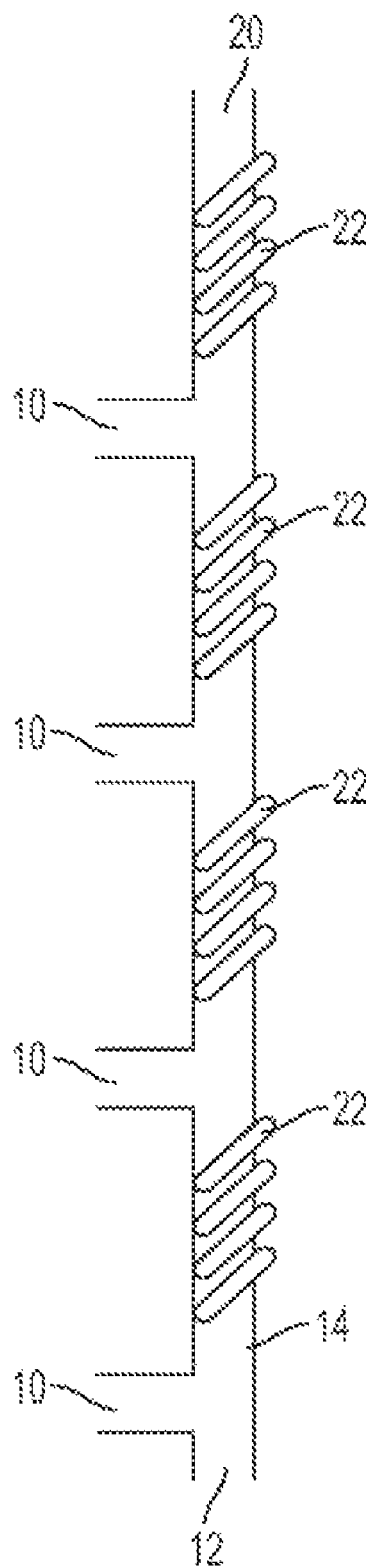
FIG. 17 is a view of one example of a sheath flow device.
Figure 18:
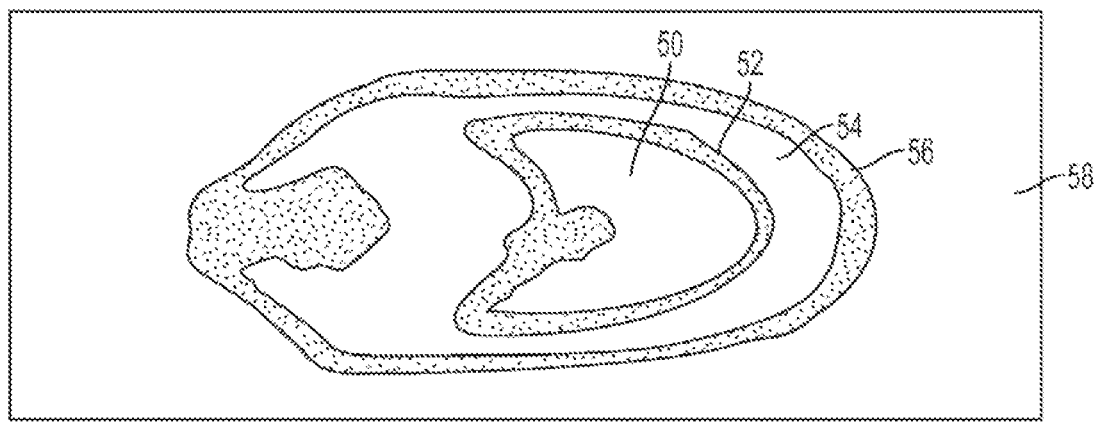
FIG. 18 is a tube within a tube made by the sheath flow device.

FIG. 17 shows a sheath flow device capable of creating a hollow tubes within a hollow tube. A sheath input 10 and a core input 14 are connected to a channel 14 having a series of fluid transporting structures 22. A series of successive sheath inputs 10 are provided downstream towards the outlet 20. Each successive sheath input 10 creates a new sheath around all the previously sheathed materials. FIG. 18 shows a hollow tube within a hollow tube that was made by using the device of FIG. 17 by alternately introducing input streams and ensheathing the structures. The deepest interior core stream 50 is surrounded by successive core/sheath streams 52, 54, 56, followed by sheath 58. Streams 52 and 56 were labeled with a fluorescent dye for contrast.

Typically, the sheath stream is sufficient to move the polymerized material to the output of the channel. For some materials, however, as the extruded material polymerizes and its viscosity increases from its unpolymerized value to infinity, the dynamics of the flow profile within the channel may change to the point that feed matching is required to control the fluid velocity and effectively remove the polymerized material. There are several options available to do feed-matching. In an elastomeric chip, the fluid velocity is controlled by compressing the channel to cause the fluid to accelerate. Additionally, rollers may be placed at the exit of the chip so that they impinge on the rod and control the linear exit velocity of the polymerized rod.

Generally, the core contains a polymerizable material and is extruded to the desired diameter using the sheath stream instead of a solid nozzle or channel. Once the desired shape is obtained, the core material is polymerized chemically or optically. Due to the geometry of the system, production can be in continuous instead of in batch mode. Moreover, the geometry of the system is particularly amenable to the production of high aspect ratio structures and filaments which are especially difficult to produce in quantity. Since the fabrication device is small, inexpensive, and essentially operates as a passive component, many devices can be fabricated to perform in parallel, such as an array.

Multiple Fibers Fabricated in a Single Channel.

Figure 20:
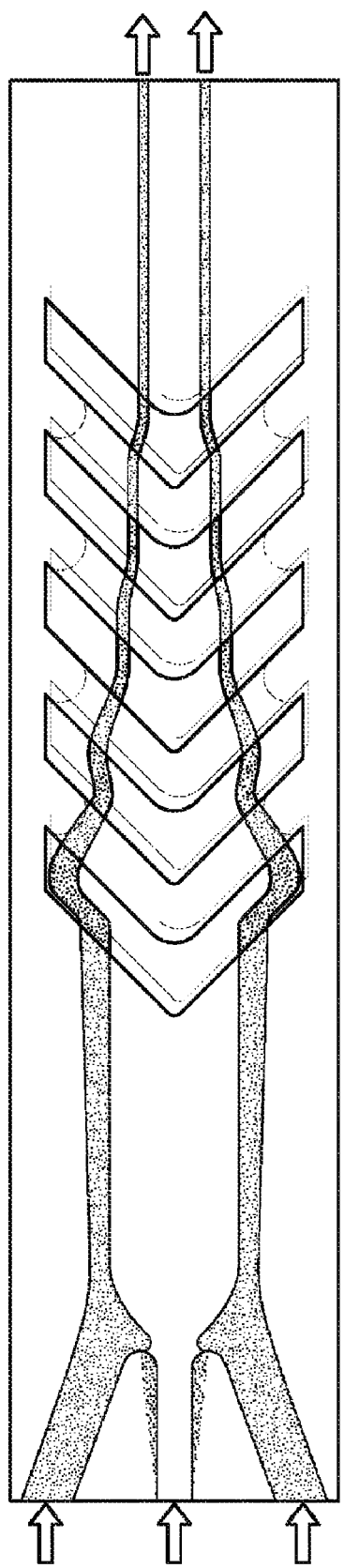
FIG. 20 shows how parallel core streams may be used for simultaneous shaping of two core streams. As illustrated, flow is from the bottom to the top of the figure. Polymerizable material is input from two outer sides of the main channel and the sheath fluid is input into the center of the main channel. The grooves channel the polymerizable material and sheath solution so that the prepolymer flows remain separate, but are completely surrounded with sheath fluid. Following polymerization, the result will be two parallel shaped fibers exiting from the same channel.
Figure 21A:
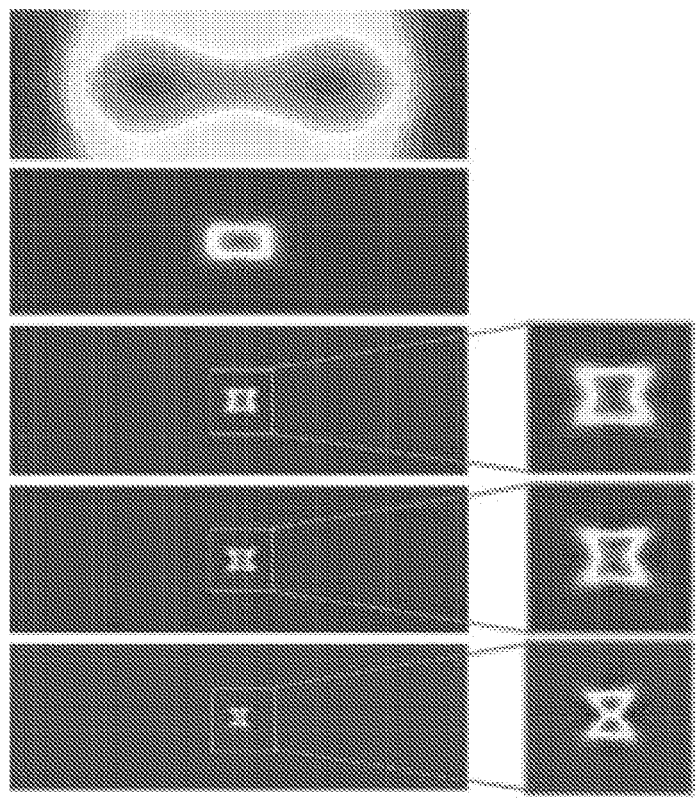
FIG. 21 shows how a split core may be obtained by controlling the relative flow rates of the core and sheath. A single stream of polymerizable material can be split into multiple streams using the appropriate combination of wall structures and relative flow rates. The simulation of FIG. 21A shows a channel with 7 chevrons in the top and bottom and prepolymer and sheath flow through the channel at flow-rate ratios of (a) 1:1, (b) 50:1, (c) 500:1, (d) 1000:1, and (e) 2500:1.
FIG. 21B shows a fiber run at the 2500:1 ratio which split into two filaments that hardened as independent, but parallel filaments.
Figure 21B:
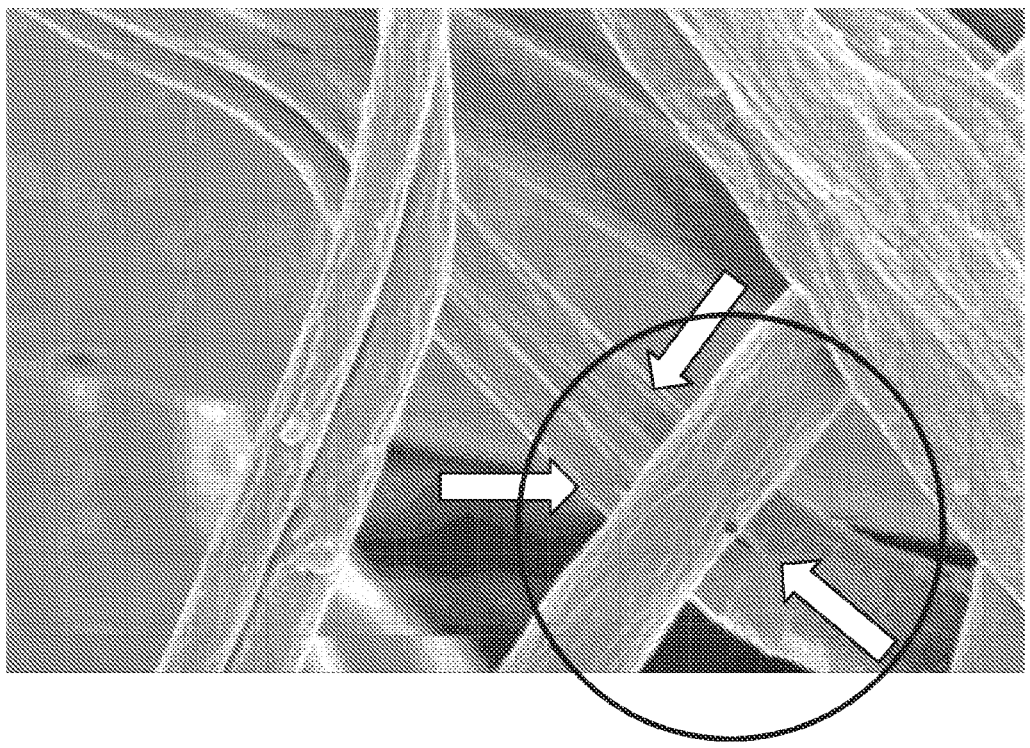
Figure 22A:
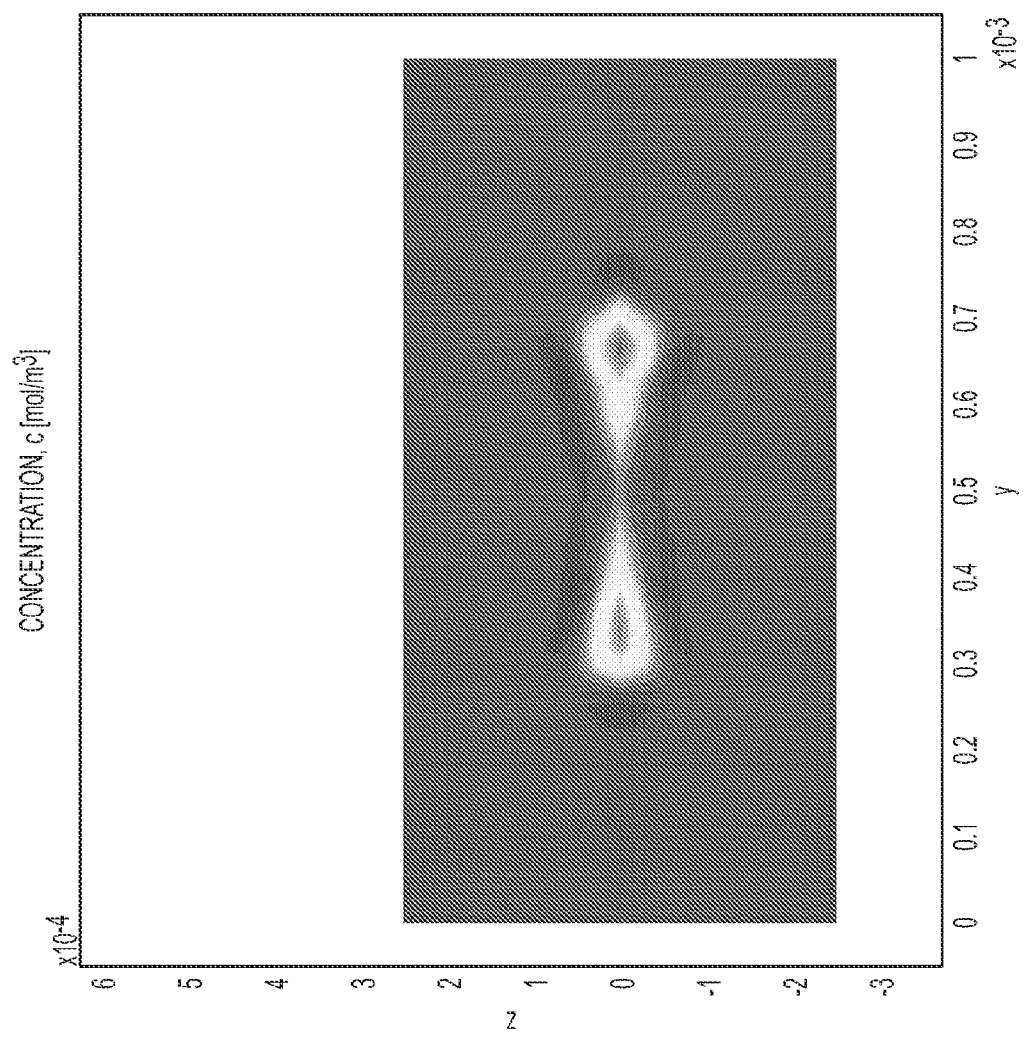
Figure 22B:
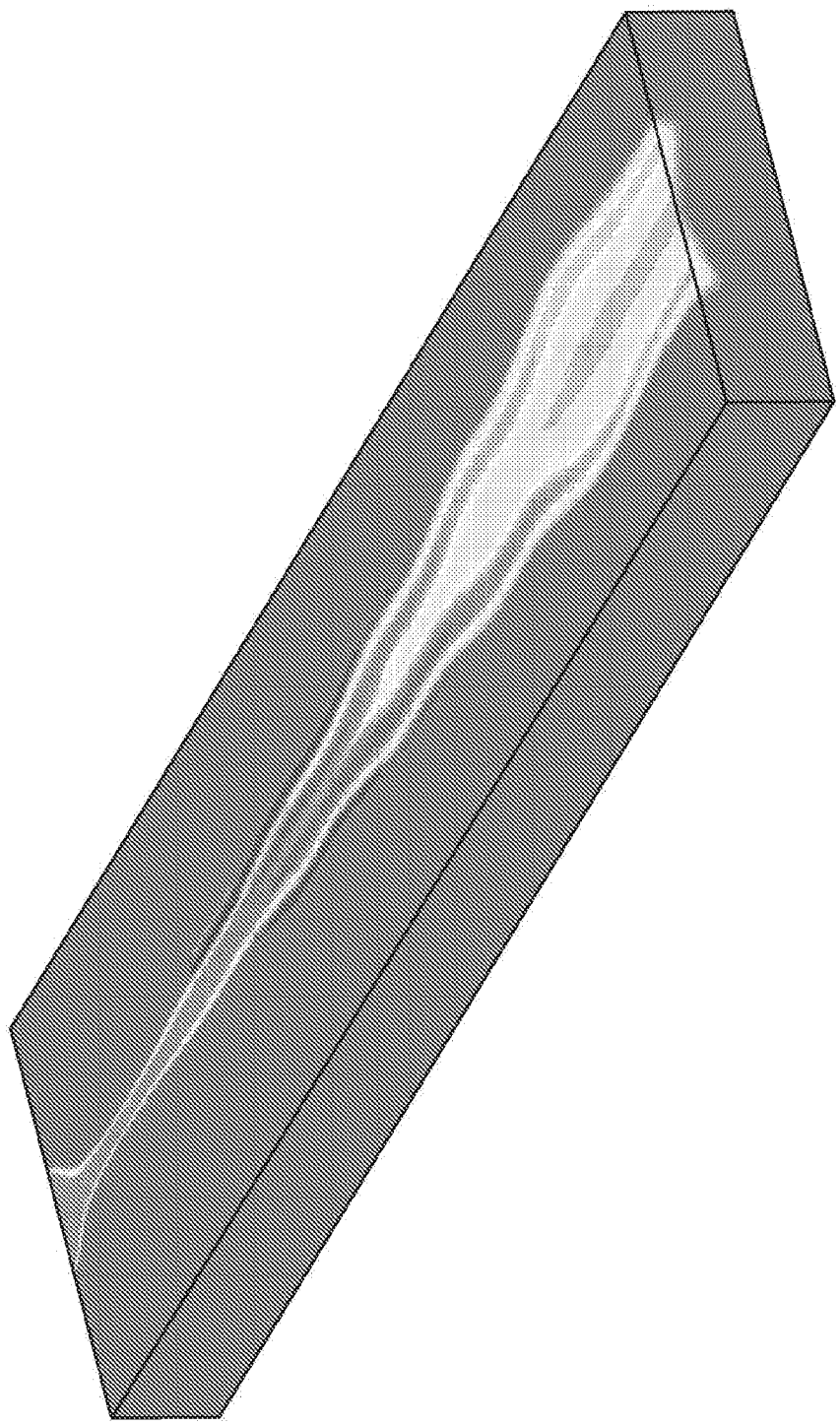
FIG. 22B shows a perspective view generated by the model.
Figure 23:
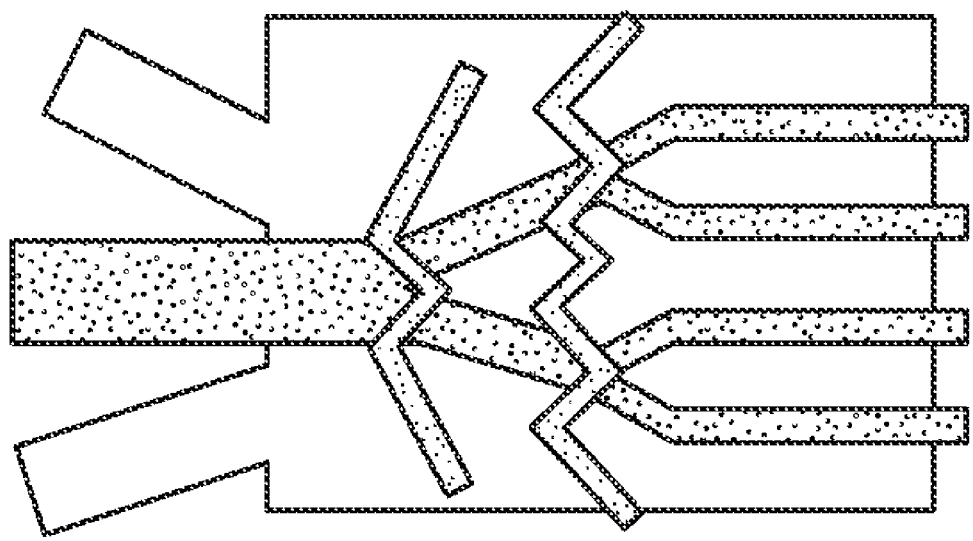
FIG. 23 shows how structures in a channel can be used to split a single core stream (black, input to center of a channel) into multiple streams for production of multiple parallel fibers.

Structures, including but not limited to grooves, ridges, and pillars, can be made in the channel floor and roof such that multiple fibers can be produced in a single channel configured to produced multiple sheathed flows. The core streams in the multiple sheathed flows are polymerized to form multiple fibers therefrom. This can be accomplished by shaping multiple inputs of polymerizable material as in FIG. 20 or by splitting a single prepolymer stream into parallel streams as in FIGS. 21A and 21B, which show a simulation and actual splitting, respectively, of a fiber caused by controlling both grooves in the top and bottom of the channel and the relative flow rates of the sheath and polymerizable material. In FIG. 21B, the circled area is where a split occurs, with arrows identifying the point where the split and the two fibers emanating from the split. By changing the flow-rate ratios, fibers could be fabricated with split regions that recombine into a single fiber. Fiber splitting could be done repeatedly to obtain multiple smaller individual fibers. FIG. 23 exemplifies a top-down view of a design that could be used to create multiple parallel fibers.

In embodiments, a split fiber has two lobes that remain attached, or the split may be complete so that two or more distinct fibers arise, such as from a corresponding number of distinct core streams.

Production of Fibers with Dimensions Altered Along Length of Fiber.

Figure 24:
FIG. 24 shows a fiber with variable dimensions. The fiber was cast from acrylate in a grooved fluidic channel with variable pump pressure on the inlets to alter the flow-rate ratio of core and sheath streams.

Relative flow rates of the polymerizable material(s) and sheath solution(s) can be altered during the polymerization/casting process to create fibers with variable dimensions along the length of the fiber. In FIG. 24, variations in the pump speed changed the ratio of flow rates of polymerizable material and sheath to produce a fiber with a cross-section that alternately thickened and thinned. The ability to taper a fiber could be especially useful for optical applications.

Production of Particles, Rods and Packets.

Modifications in the methodology for producing shaped fibers can be used to produce particles, rods, or packets in the same type of microfluidic devices. A packet refers to an enclosed hollow shape. The method of use can generate control over the length of the structures by a variety of mechanisms while the cross-sectional shape is determined as already described for fibers. Mechanisms for breaking the continuity of the core stream can include "chopping" the light used for UV polymerization to make rods or particles with defined length; subjecting the core to piezoelectric, acoustic, or other alternating forces to move the core back and forth in the sheath stream; alternating polymerizable and nonpolymerizable chemical solutions in the core stream; and/or using variations in flow-rate ratios to pinch off the core into discrete parcels.

Similarly, magnetic or electric forces could be applied in a fixed or modulating fashion across a channel in order to modify the alignment of material, including the polymerizable material and/or content suspended therein. Such forces can also be used to create a gradient, discussed below.

Electric or magnetic fields can also be applied longitudinally along the channel (parallel to the direction of flow) to encourage alignment of polymer chains. For example, with cationic polymerization, a longitudinal electric field could draw the positively-charged reaction centers in a direction along the forming fiber, causing the polymer backbone to trail behind.

Production of Fibers with Encapsulated Cells, Enzymes or Other Biological Elements.

Fibers or packets could be made with biocompatible polymers, including but not limited to collagen, agarose, polyelectrolytes, chitosan, polyethylene glycol derivatives or peptides, and used as scaffolds or hollow supports for tissue engineering or extended cell culture in mammalian systems. Hollow fibers or packets could include cells (such as mammalian cells), the cells could grow outside the fibers with nutrients and/or antibiotics delivered through the fibers, or cells could be embedded in the fibers. The applications for such materials include, but are not limited to, wound healing, tissue engineering, pharmaceutical screening and bioprocessing.

Fibers could be used to encapsulate cells (such as bacterial cells) or spores selected or engineered for biomanufacturing, biosensing, or bioremediation. For use in the field, whether as sensors or for decontamination, cells must simultaneously be protected from the environment and exposed to it. The level of tolerance to non-optimal conditions is much higher for bacteria genetically modified for sensing or selected for degradation capability than for mammalian cells, though the latter are also under development as canaries. Bacteria have been encapsulated, immobilized, or used free in solution. The first approach usually stabilizes the bacteria but can limit transport of the target compound to the bacteria, the second often damages the bacteria, and the third requires large quantities relative to the fluid being tested. Testing times range from hours to days, depending on the resistance of the bacteria to the toxicity of the sample matrix.

The inclusion of target-reactive bacteria in hollow microfibers, along with nutrients and stabilizers (e.g. trehalose), can be used for continuous monitoring of effluents from air samplers, drinking water, or other sources. Cell lines reported in Anal. Chem., 82: 6093-6103 (2010) are exemplary candidates for such use. These cells form spores that are highly stable for long periods (24 months at room temperature or 12 months under extreme temperature and humidity/drought environments), yet can be germinated and produce a measurable response to target analytes in ~2 hours. The two genetically modified lines generate a luminescent signal in the presence of zinc (*Bacillus megaterium*) or arsenic (*Bacillus subtilis*). The zinc sensing system employs the enhanced green fluorescent protein (EGFP) as a reporter, which is detected by exciting with UV light, while the arsenic sensing system utilizes $\beta$-galactosidase, which can be detected by a chemiluminescent substrate. Substrates are present within the spores and do not need to be added exogenously. Spores are ideal biosensing elements in that they are rugged, inexpensive to produce and easy to make and germinate. Indeed, sensing spores can be cycled from dormant to active over a period of at least two years without any significant loss in their analytical performance. Moreover, storage of spores under a variety of stressful and stringent conditions does not affect their sensing ability when brought back to active cells.

We have demonstrated that microchannels with grooved structures in the top and bottom of the channel can be designed to use a phase-matched sheath fluid to focus a polymerizable core stream into a predetermined shape without mixing. The cross-sectional dimensions can be determined by the relative flow rates of the sheath and core. Using multiple fluid additions, successive layers of fluids can be wrapped around the core. The cell-containing core fluid, including stabilizers if necessary, and a hydrogel or other biocompatible polymer is defined so that it matches the viscosity of the fiber prepolymer. The composition of the fiber prepolymer is designed for rapid polymerization without cell damage; in addition to the acrylate recipes used to date, we can use polymers based on click chemistry (e.g. Applications of click chemistry themed issue of Chemical Society Review, edited by M. G. Finna and V. Fokin 2010, especially C E Hoyle, A B Lowe, and C N Bowman Chem. Soc. Rev, 2010, 39:1355-1387). Composition and thickness of the hollow fiber layers can be adjusted as necessary to provide strength and stability with maximum diffusive transport.

The cell-fiber system is designed to accomplish the following:

1. The cells are stabilized in a ready-to-use format during shipping and storage at room temperature.

2. Nutrients needed for cell reactivation are encapsulated into the cell-fiber mat for operator convenience using several strategies.

3. The cell-fiber mats provide high surface area-to-volume for sample interrogation.

4. The cell-fiber mats provide a convenient footprint for automated, continuous monitoring.

5. Optics for luminescence detection are very simple (filter and photodiode) and can be battery operated.

6. Cells with new specificities for detection, catalysis or degradation can be genetically engineered and incorporated into the fibers, either singly or in mixtures.

7. The fiber mats prevent released of genetically modified organisms into the environment. Used materials can be easily destroyed for safe disposal.

The technology developed for sensing can be extended to decontamination with the availability of appropriate cells. The fibers can be aligned or woven to make filters for decontamination or textiles for protection of warfighters or hazmat workers.

Fibers or Particles with Encapsulated Enzymes or Other Biological Elements.

The embedding of active biomolecules (such as enzymes or other proteins) in the fiber is simpler than encapsulating active cells. Methods for encapsulating active enzymes in hydrogels, sol gels, polymer beads, polyanionic films, and other materials are well documented. Nevertheless, there is still a need for maintaining biomolecular activity in filters, woven fabrics, beads, and other solid phases used for biomanufacturing, separations, remediation, protection, and sensing. The active biomolecules can be encapsulated randomly throughout the shaped fibers, along with any required stabilizers or cofactors, or these molecules can be included in a core layer surrounded by a layer polymerized to have the optimum porosity for the desired function. Molecules that promote capture and transport of the target from the outside to the inside of the fiber can be included throughout or just in the outer layer(s).

For example, the fibers could include a polymer matrix of appropriate porosity and containing carboxylic moieties, $Cu^{2+}$ chelated to the vinyl groups for binding phosphonates, and an enzyme for catalysis. It has been demonstrated that hydrodynamic focusing in microfluidic channels can be used to fabricate porous acrylate fibers with pre-designed cross-sectional shapes (see Thangawng et al., Lab Chip 9 (2009) 3126-3130). Round fibers or flat ribbons have been made with dimensions from ~300 nm to ~300 µm in lengths up to meters. The fibers have been spooled so that they are aligned in parallel or collected them in randomly organized mats. The fibers have been characterized in terms of shape, dimensions, molecular organization, and tensile strength. Depending on the size and method of polymerization (casting or UV), the fibers can make them more or less porous. A key metric will be the amount of liquid or air that can be wicked into a gram of fiber, which will depend on the fiber geometry, weave pattern (pores, capillary action), and fiber chemistry (surface wetting, swelling, internal porosity). Shape and organization are important since as the distance that the toxic agent must diffuse from the surface of the fiber to the active components is decreased, the faster the target molecule can be bound and/or degraded.

The same considerations apply to the encapsulation of molecular recognition elements, with or without enzymatic activity. Once could design fibers or particles that include sensing molecules along with molecular elements for signal generation, including but not limited to fluorescence, chemiluminescence or electrochemical signals. The response to molecular recognition could include controlled release of a drug or therapeutic, such as the release of insulin in response to detection of high glucose levels in vivo.

Shaping of Fibers for Assembly into Larger Scale Materials with New or Improved Properties.

Round or non-round fibers may be formed into larger scale materials. Exemplary larger scale materials include, for example, textiles, composite films, environmentally sensitive smart materials, high strength materials, cables, yarns, etc. Fibers produced by standard methods such as extrusion or electrospinning are round due to the minimization of interfacial tension at the boundary between the prepolymer core and surrounding air or other phase, however the properties of non-round fibers may be exploited in larger scale materials. For instance, post-polymerization modification, such as twisting, of non-round fibers can create periodic structures in the fiber. Larger scale materials can also be prepared by techniques known to those of skill in the art, for example, spinning, weaving, and/or nonwoven production methods (staple nonwovens, spunlaid nonwovens).

Figure 25:
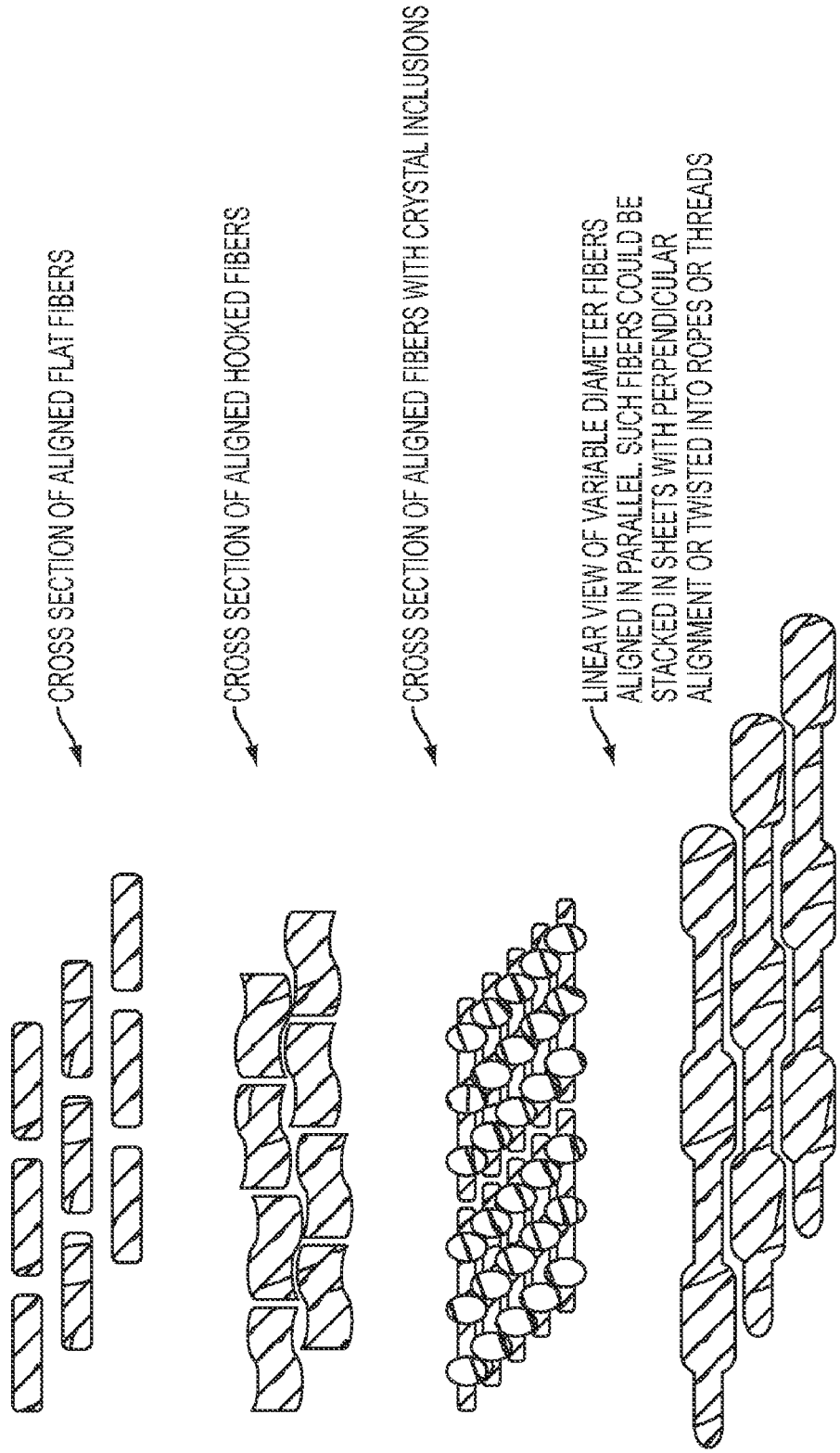
FIG. 25 shows examples of organizing shaped fibers.
Figure 26A:
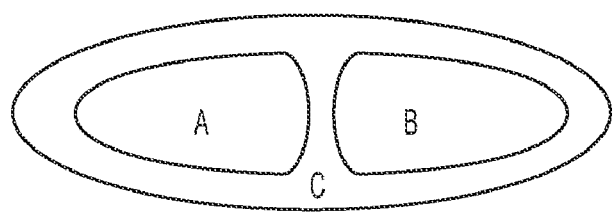
FIG. 26A shows example of multi-component fiber cross sections.
Figure 26A:
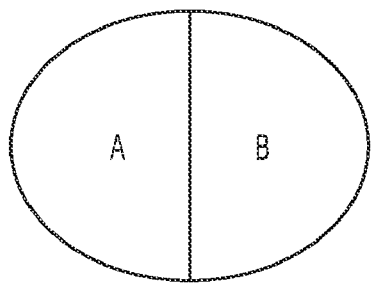
Figure 26A:
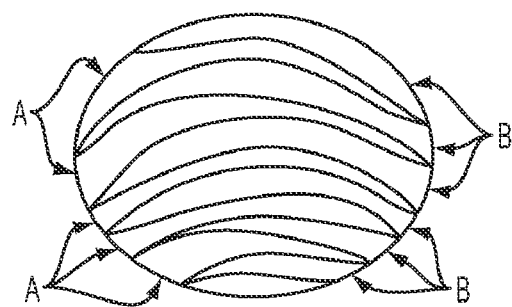
Figure 26A:
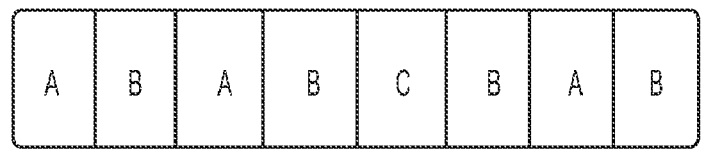
Figure 26B:
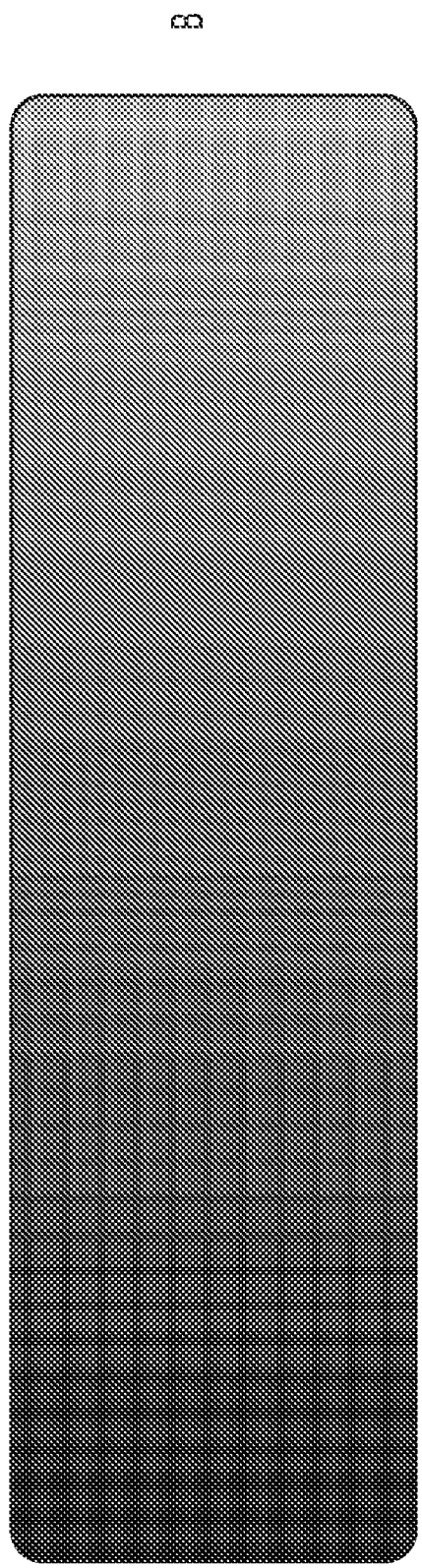
FIG. 26B shows a schematic cross-section of a fiber with a gradient cross-section.

The interaction of shaped filaments or fibers in such materials could provide new or improved strength, flexibility, potential for actuation, or other new properties. Various types of fiber shapes and exemplary larger scale materials are illustrated in FIG. 25.

Phase-separating materials, such as certain polymer blends or block copolymers can be used to cause the self-assembly of structures within or on the surface of the fibers. These structures may be aligned with or across the fiber and can play a role in the formation or function of larger scale materials.

Production of Fibers Via Interfacial Reactions.

The polymerization, precipitation, or other hardening reactions can be initiated by the combination of compounds that takes place at the core/sheath boundary, or other interface between streams such as between an interior core stream and exterior core stream. It is also possible to have multiple streams that come in contact to produce a reaction. Such technology could be broadly classified as an interfacial reaction.

The kinds of interfacial reactions that can produce polymers during hydrodynamic focusing can generally be classed into two categories. In the first, the reaction that takes place at the interface immediately produces a solid product, which ultimately seals the interface and caps the reaction so that the reaction is limited to the interface. The result would be an extruded material at least initially in the shape of the interface. One example of such a reaction is in the production of nylon, such as at a hexane/water boundary. The second category of reaction is one which can continue to propagate into the bulk of the material once the two flows are brought into contact, for example precipitation of PMMA described below, wherein the PMMA solvent is still mobile in the solidified PMMA, and continues to leave the fiber even after the perimeter has already hardened. Another example would be the introduction of an initiator to a living polymerization. Once initiated at the interface, the reaction center can then continue to migrate into the bulk of the liquid monomer.

In an example of an interfacial reaction propagating into the bulk of the material, a solution of polymethylmethacrylate (PMMA) in acetone (other suitable solvents can be used) was sheathed in an aqueous solution. As solvent diffused out of the core into the sheath, the PMMA precipitated to form a fiber. In addition to simple precipitation, other reactions can be used, including acid/base chemistry, introduction of chemical initiators, and step-growth polymerization.

Although the shaping grooves function most reliably in one-phase systems, fibers have been produced in two-phase systems as well. It is also possible to temporarily remove the interface of a 2-phase system by placing a thin layer of an intermediate solvent between the two materials. As an example, a thin layer of isopropanol (IPA) can be placed between water and hexane. Being miscible with both water and hexane, the IPA will replace the sharp water/hexane boundary with diffuse water/IPA and IPA/hexane interfaces. If made of appropriate thickness, the IPA will maintain the one-phase condition through the shaping of the fluids.

Production of Fibers with Lateral Variation in Composition.

More than one polymerizable material can be incorporated into the same core, resulting in fibers with multiple compositions in a predefined conformation. FIG. 18 shows a cross-section through a channel where several concentric flow streams have been created. Inclusion of polymerizable materials in the flow stream would produce a fiber with several concentric layers. A concentric configuration could be particularly useful in situations where a fiber is wanted with differing bulk and surface properties. It is expected that a wide variety of configurations of two or more polymerizable materials can be constructed using the shaping structures. FIG. 26 shows just a few possible conformations that can be created. The lateral composition does not have to be discrete. Elements placed upstream of the sheathing can be designed to create continuous gradients as well, such as those found in gradient index fibers. Alternatively, merger of multiple streams prior to polymerization can be used to create lateral gradients.

Gradients can exist in one or more components of the core and/or sheath. For example, gradients can exist in the concentration of crosslinker, ions, and/or polymerizable material. More than one gradient can exist simultaneously.

Not all of the structures in the shaped streams need to be something that ultimately hardens. For example a hollow fiber could be made that is filled with a liquid. Because structure can also be changed longitudinally, the lumen can be pinched off periodically, so that a cut in the fiber does not cause its entire length to drain. Applications for this kind of structure would include drug release, contaminant sequestration, phase-change thermal fabrics, etc. The structures could also be deliberately drained after fiber production, thereby creating voids. Large voids could be used as tubing, while multiple smaller voids have a possible application in photonic materials. It should also be noted that unlike classical extrusion technologies, the voids can be made to split or recombine by the same mechanism used to make fibers that split and recombine (as noted above with regard to multiple fibers from a single channel).

Production of Fibers with Residual Stresses (Curly Fibers).

Figure 27:
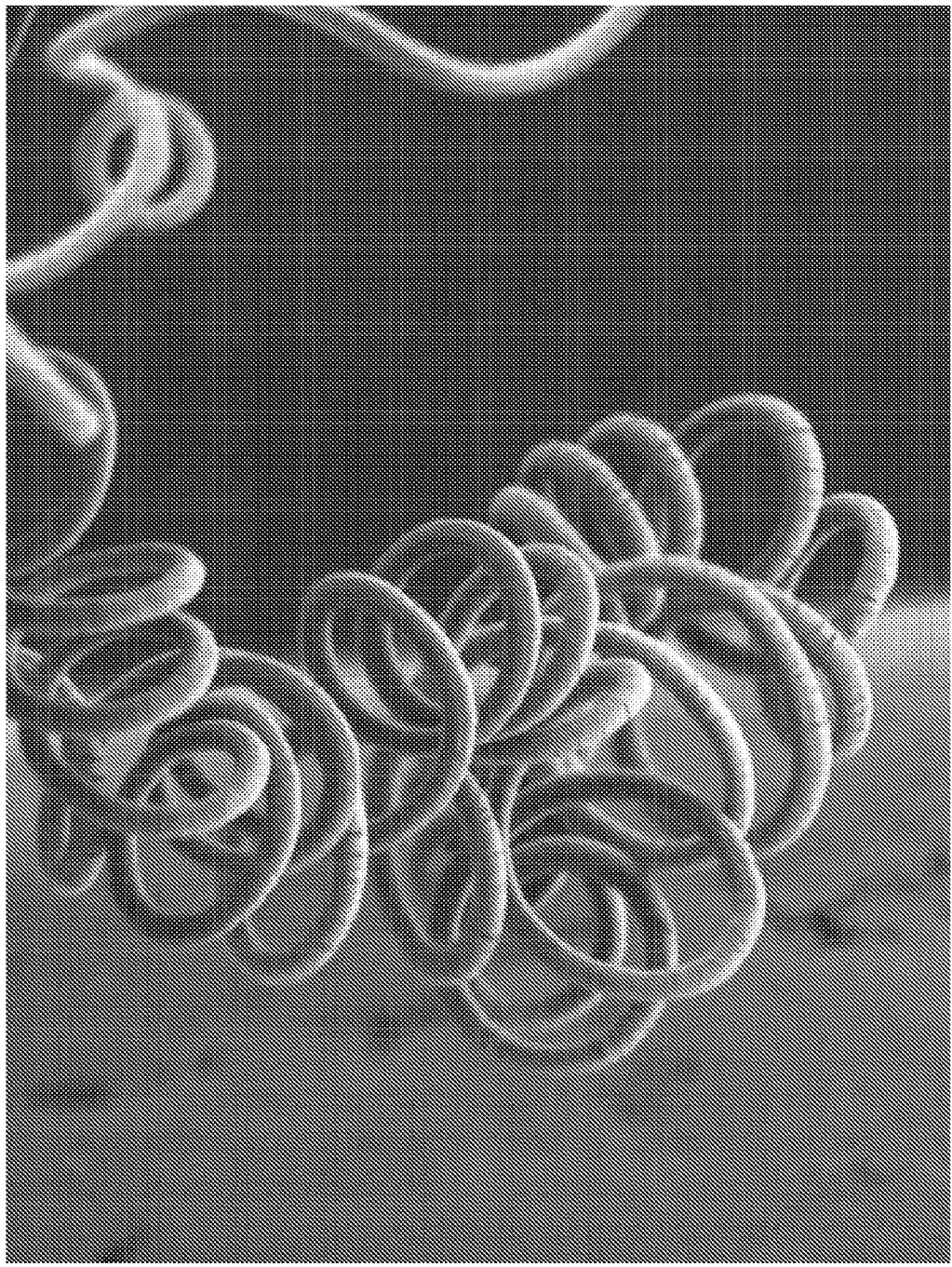
FIG. 27 shows a curly fiber.
Figure 28:
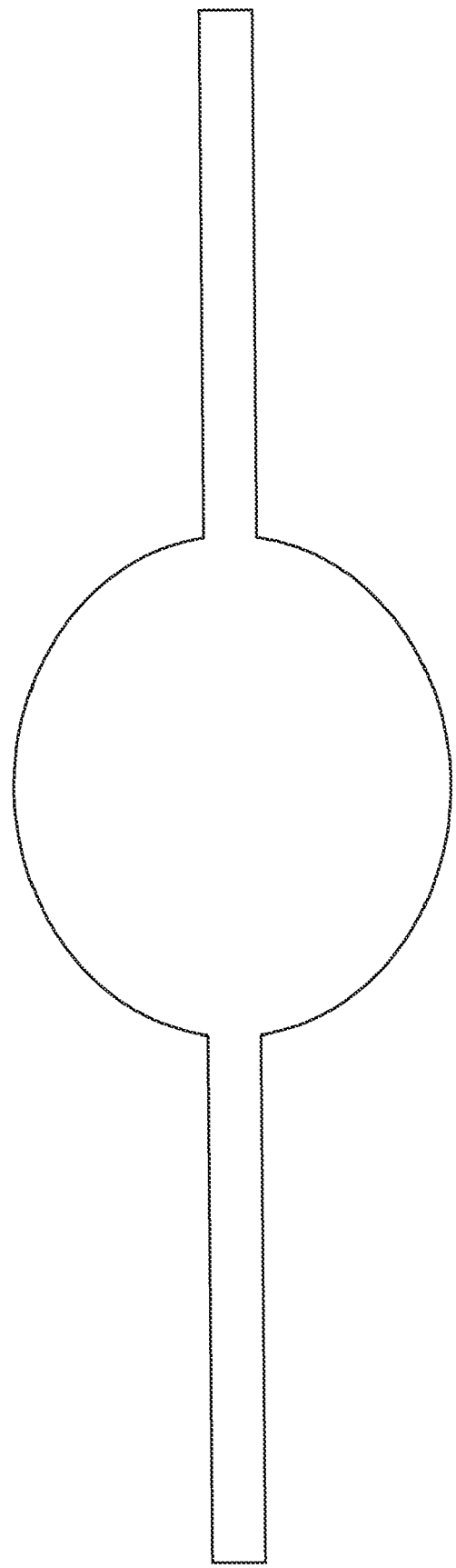
FIG. 28 shows a schematic cross-section of a fiber with high surface area.

Another layer of structure can be added to the fiber by introduction of residual stresses. Many polymers contract during curing. By using the ability to make fibers of differing lateral compositions, one could deliberately engineer the contraction to cause the fibers to curl. Differential curing could also be induced by chemical, light or other gradients. FIG. 27 shows a fiber where stresses were introduced, most likely due to a light shining on one side. Prestressed fibers are not limited to round shapes. A fiber could be produced with a central core and one or more long "wings" extending from the core, seen in FIG. 28. If the core is designed to contract during curing, the wings will develop a scalloped or frilled pattern. Such a fiber would have a higher surface area per unit length, making it well suited for filtering or catalytic applications.

Deliberate Buckling, Breaking, or Other Effects of Applying Forces on Nascent Fibers.

Figure 29:
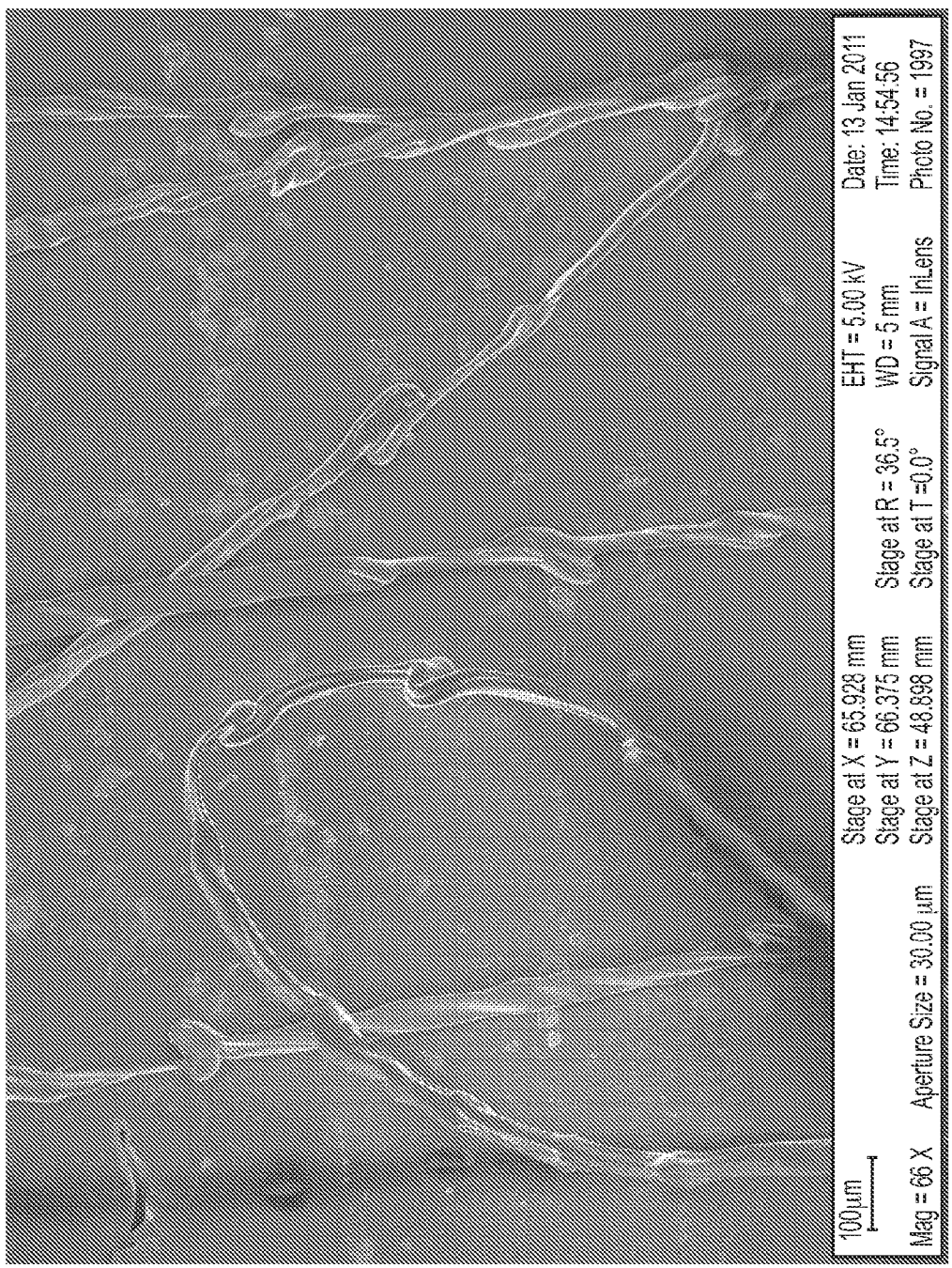
FIG. 29 shows a fiber exhibiting regular viscous buckling.

As the material comprising the fiber hardens, it can be subjected to forces that affect its ultimate molecular or gross structure. One example can be seen in FIG. 29. When a viscous fluid stream is forced to decelerate, it can buckle upon itself as seen here. This viscous buckling can take other forms, including the spiral motion of a stream of syrup as it lands on a surface. A similar behavior could be used to create helical fibers. The forming fibers could also be exposed to stretching or bending. If the material is ductile enough, this could simply help to align polymer fibers or have other desirable effects on the composition of the fiber. If a more brittle material is used (e.g. sol gels), the result could be the break-up of the fiber into rods of regular size, shape, and aspect ratio.

Printing with Sheathed Flow.

A partially polymerized stream can be directed onto a surface while the surface is moved relative to the stream, or vice versa. If polymerization is incomplete at the time the fiber is laid down, there is a tendency for the fiber to adhere and conform to the substrate on which is it being laid. Preferably under computer control, patterns can be laid down on a surface, and multiple levels of a fibers could be laid down to print three-dimensional objects, with the resolution of the object set by the diameter of the fiber.

Each document cited herein is incorporated herein by reference. Furthermore, one of ordinary skill in the art will understand that many modifications and variations of the present invention are possible in light of the above teachings. It is therefore to be understood that, within the scope of the appended claims, the invention may be practiced otherwise than as specifically described.

What is claimed as new and desired to be protected by Letters Patent of the United States is:

1. A method of creating a sheathed flow comprising:
providing a channel having a proximal end and a distal end, said channel having opposed facing top and bottom surfaces, said channel having at least one first fluid transporting structure across said channel located on said top surface and at least one second fluid transporting structure across said channel located on said bottom surface,
said first and second fluid transporting structures being located between said proximal and said distal end and on opposing surfaces facing one another across the channel; and
introducing a sheath stream and a core stream at said proximal end of said channel, said sheath and core streams flowing down said channel side by side towards said distal end, wherein said fluid transporting structures transport said sheath stream across said top and bottom surfaces of said channel to surround said core stream, thereby creating a sheathed flow,
wherein the core stream comprises a polymerizable material; and
polymerizing the polymerizable material.

2. The method of claim 1, wherein a single channel creates multiple sheathed flows and wherein the polymerizing comprises polymerizing said multiple sheathed flows to form multiple fibers therefrom.

3. The method of claim 1, wherein relative flow rates of the sheath stream and core stream are varied, and further comprising polymerizing said sheathed flow, thereby producing:
(a) a fiber having a variable cross-section along the length of the fiber; and/or
(b) a plurality of fibers of differing cross-section from a single channel.

4. The method of claim 1, wherein the polymerizing results in the formation of particles, rods of defined length, or packets.

5. The method of claim 4, comprising modulating light energy used for polymerization.

6. The method of claim 4, comprising subjecting the core flow to a variable piezoelectric or acoustic force to move it within the sheath stream.

7. The method of claim 4, wherein the composition of the core stream is varied so as to control the ability of the core stream to be polymerized.

8. The method of claim 4, wherein relative flow rates of the sheath stream and core stream are varied.

9. The method of claim 1, wherein the polymerizable material is biocompatible and the core stream further comprises one or more cells, spores, or active biomolecules.

10. The method of claim 1, wherein the polymerizing results in the formation of non-round fibers.

11. The method of claim 10, wherein the non-round fibers are flat, hooked, and/or have a variable cross-section along the length of the fiber.

12. The method of claim 10, wherein the non-round fibers are formed into a larger scale material.

13. The method of claim 1, further comprising initiating polymerization by reaction of compounds at an interface between streams.

14. The method of claim 13, wherein said reaction is restricted to said interface.

15. The method of claim 13, wherein said reaction propagates beyond said interface.

16. The method of claim 1, wherein a fiber is formed that has a gradient cross-section.

17. The method of claim 1, wherein the polymerizing results in the formation of a curled fiber.

18. The method of claim 1, wherein the polymerizing results in the formation of a fiber having lateral protrusions.

19. The method of claim 1, wherein the polymerizing said sheathed flow to form a fiber occurs while subjecting said sheathed flow to a force that affects is molecular or gross structure.

20. The method of claim 19, wherein the fiber is buckled or helical.

* * * * *